July 1, 1969
T. E. ROBERTS, JR
3,452,791
POSITIONING MECHANISM
Filed May 1, 1967
Sheet 5 of 13
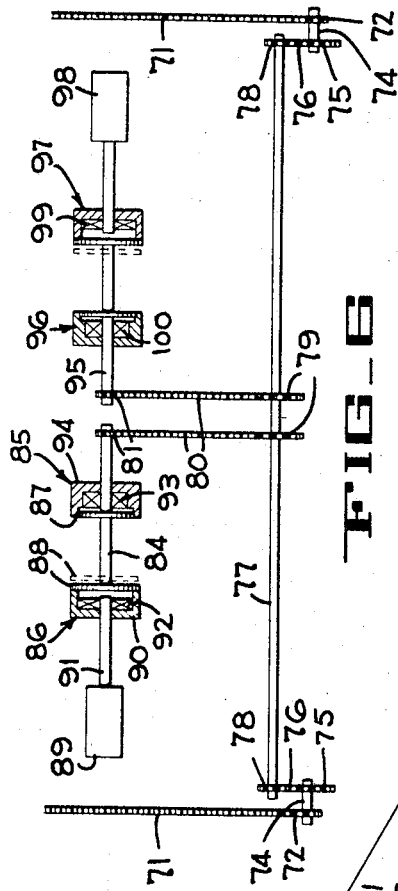
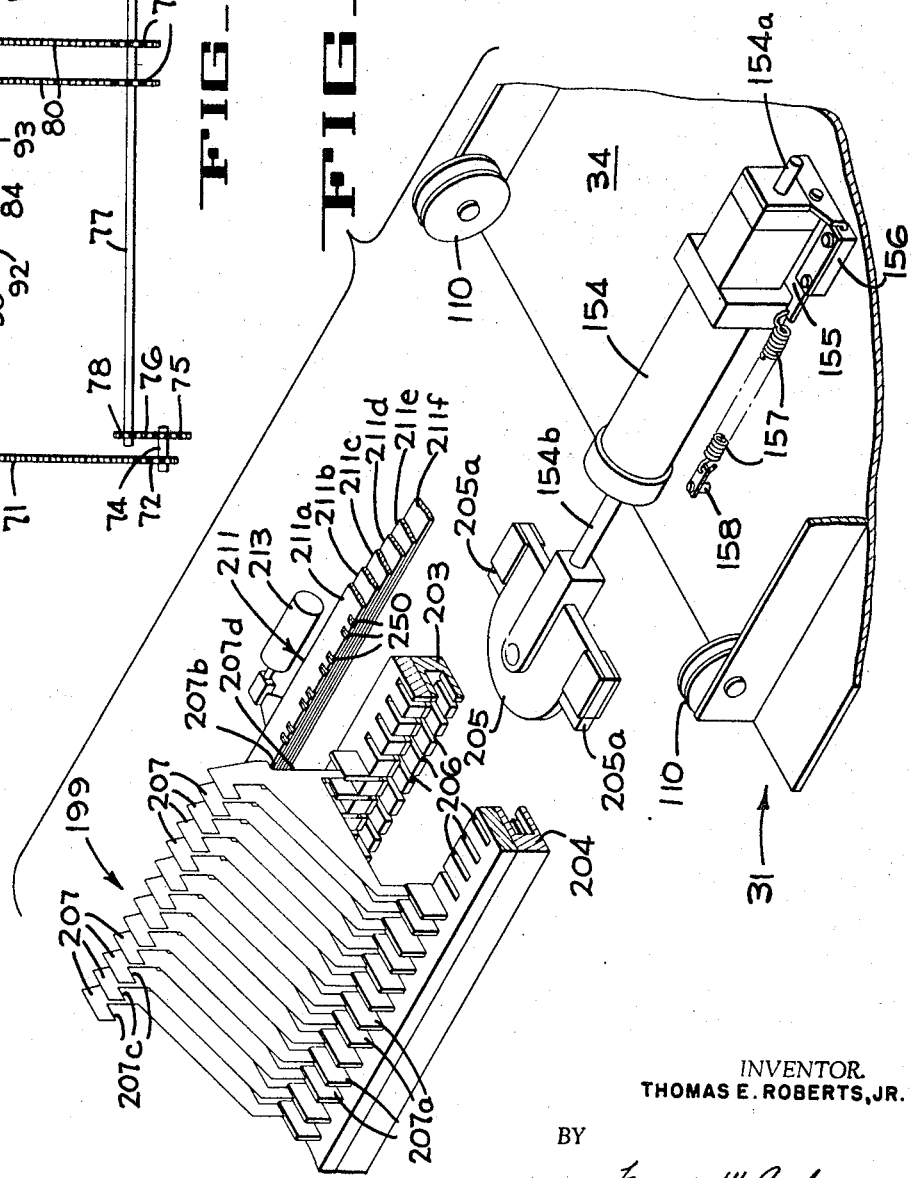
INVENTOR.
THOMAS E. ROBERTS, JR.
BY
*Francis W. Anderson*
ATTORNEY

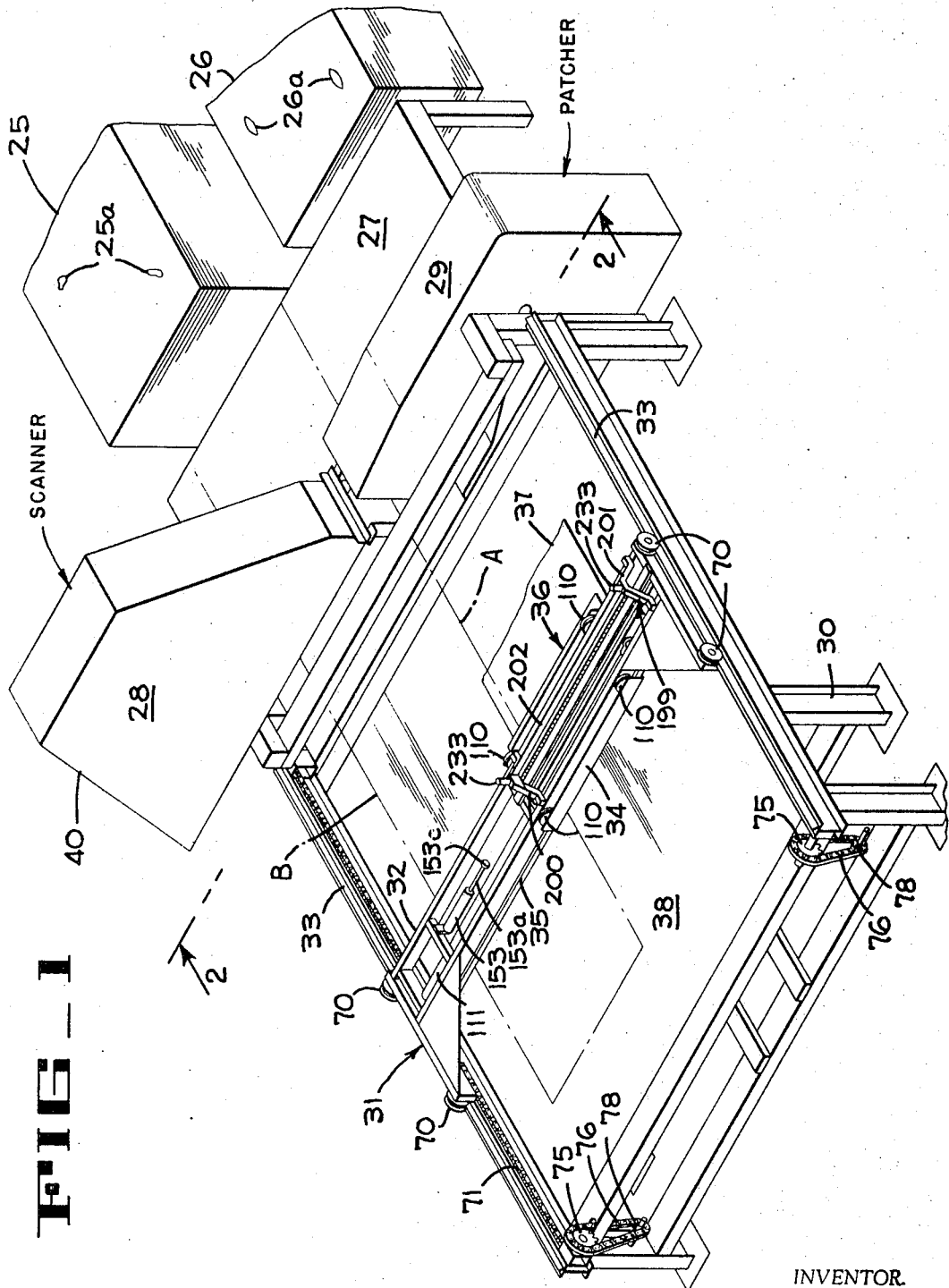

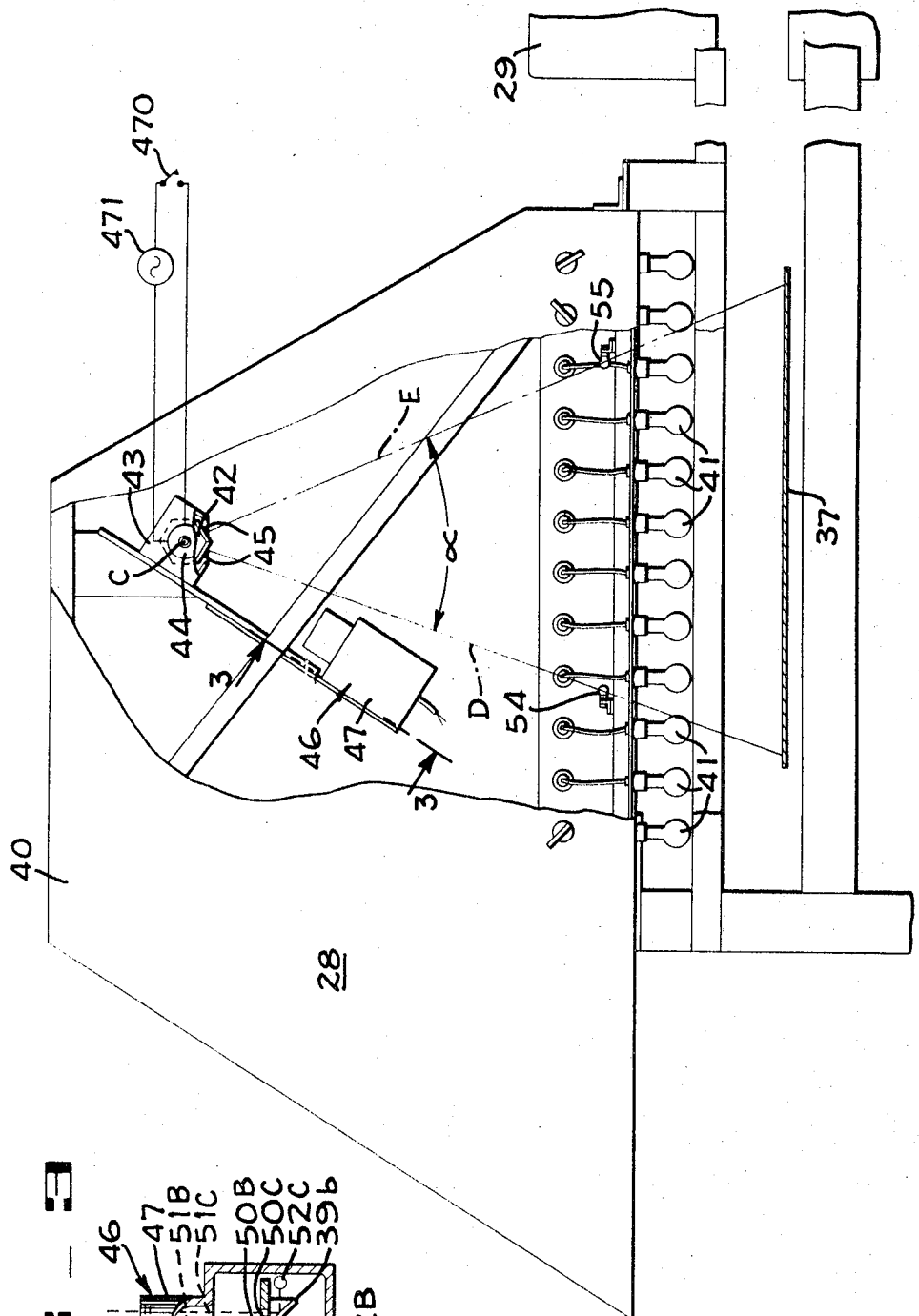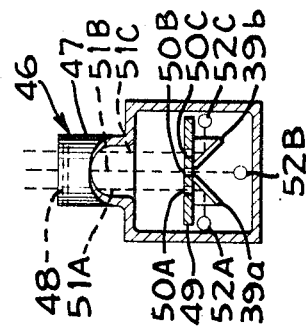

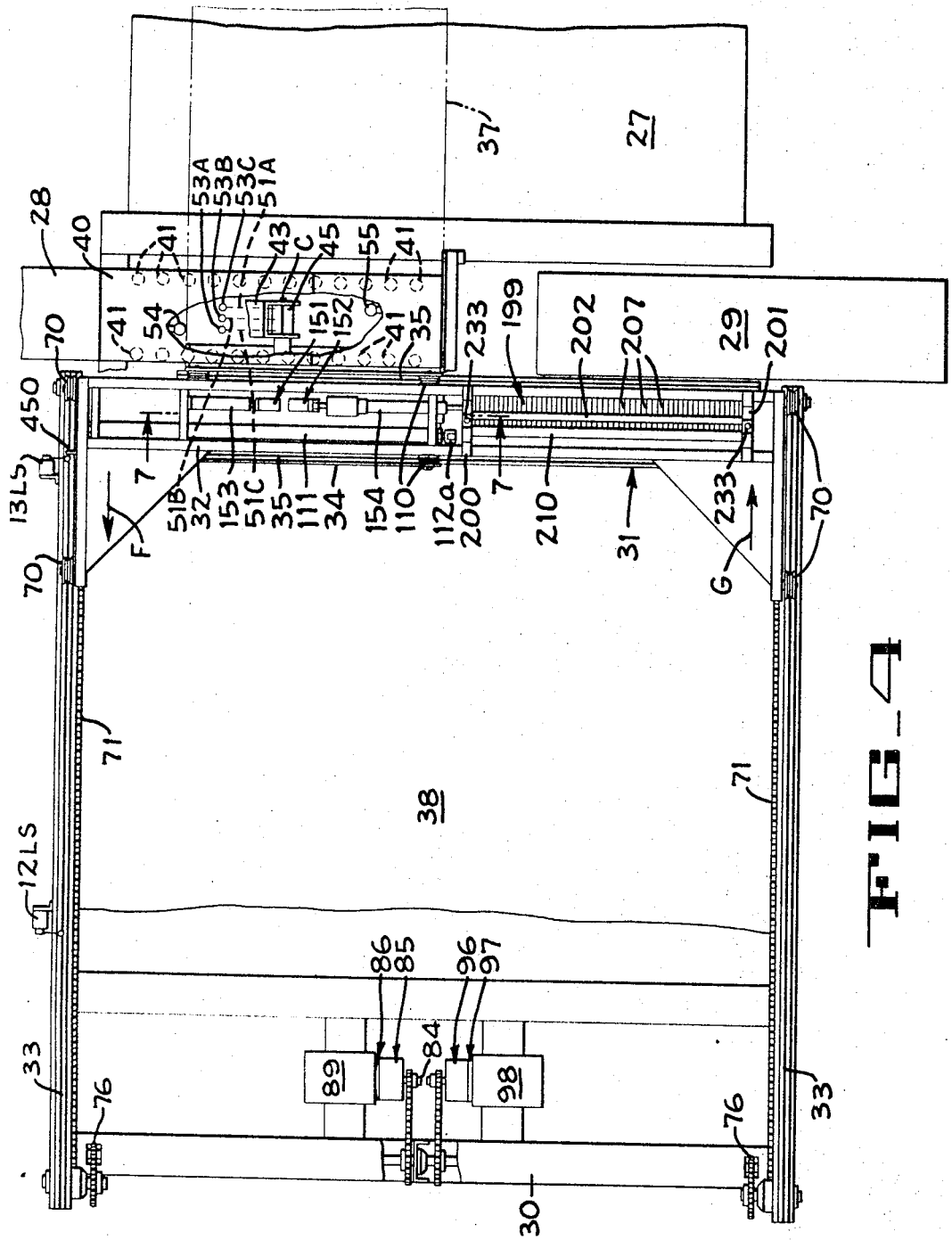

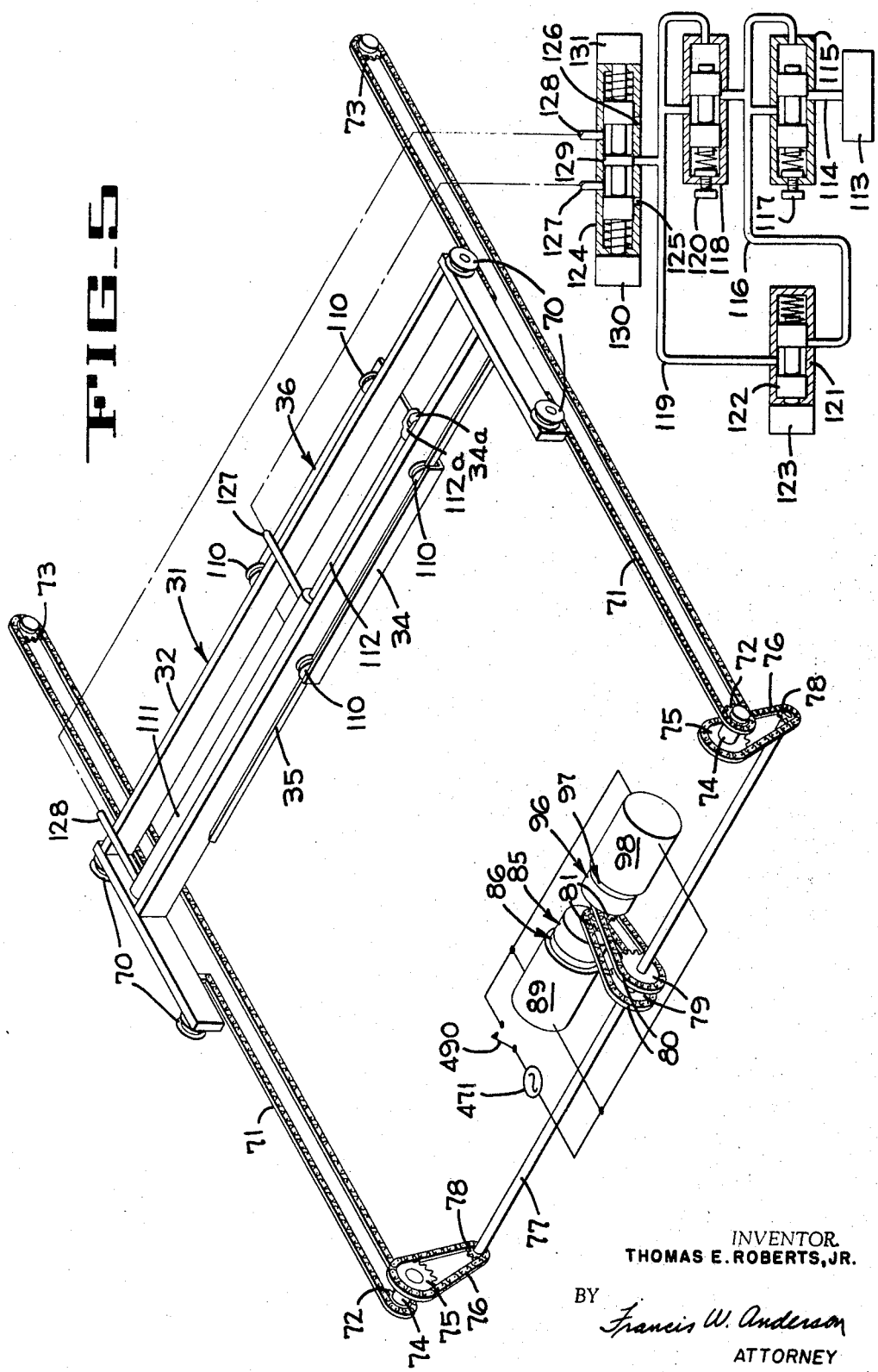

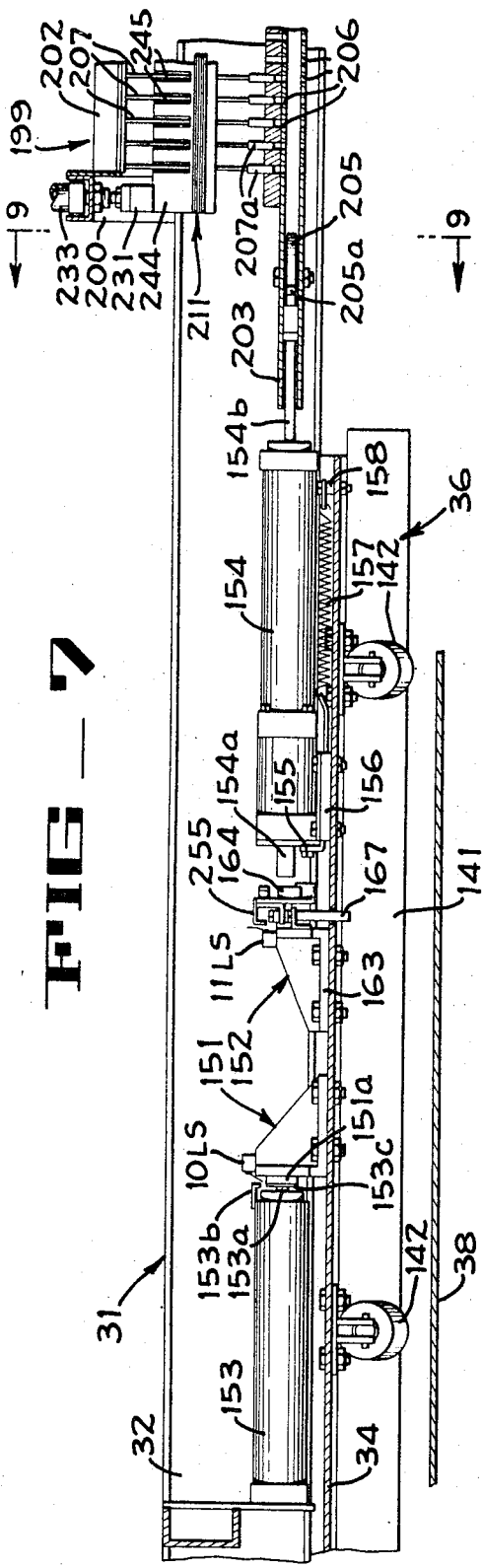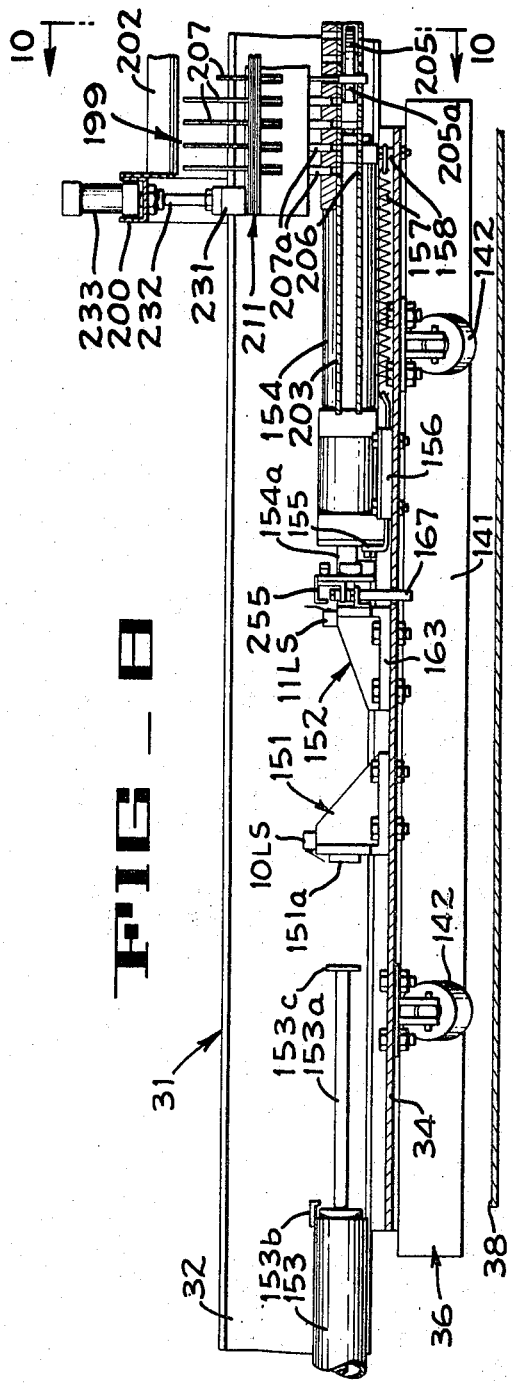

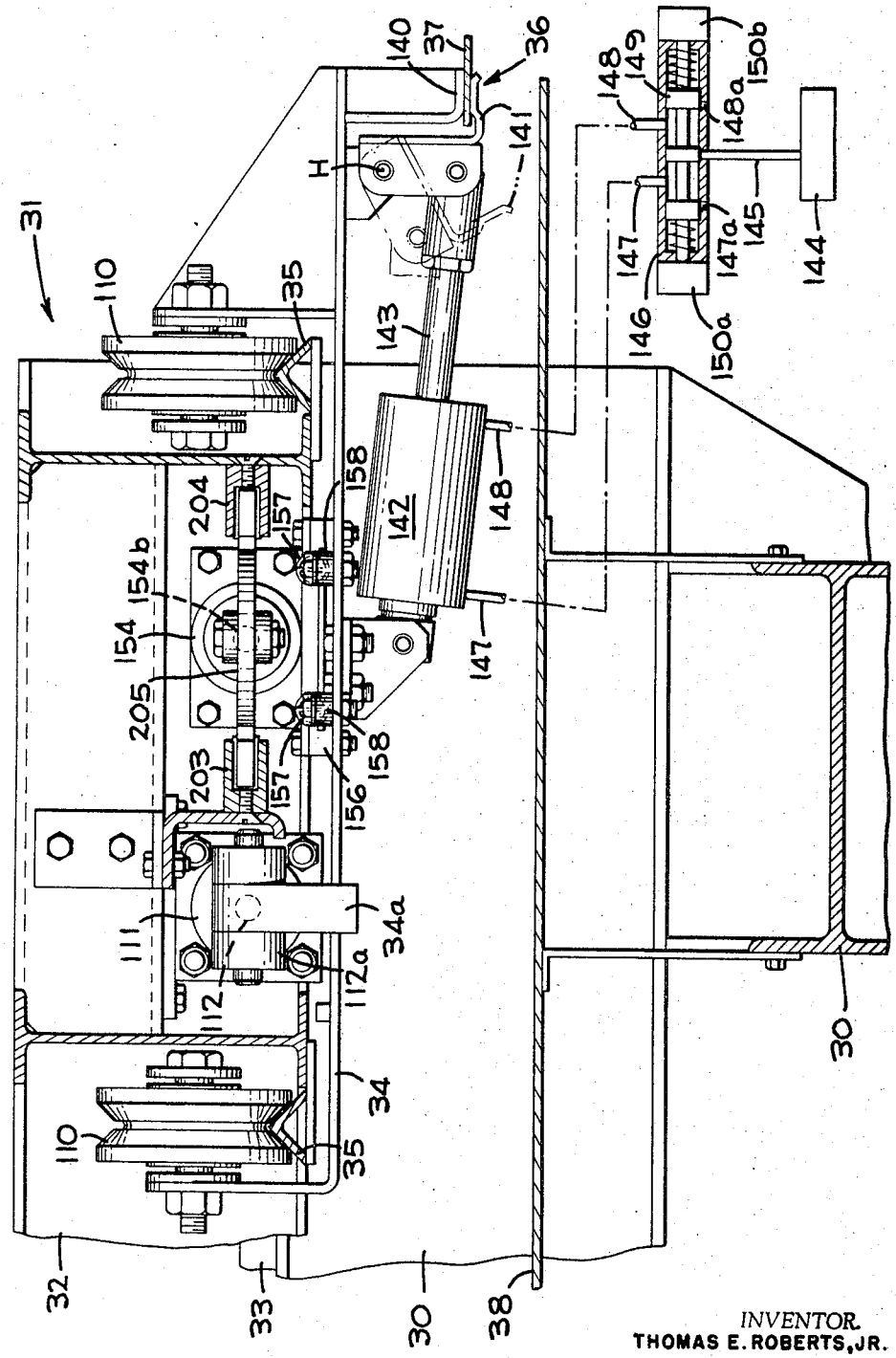

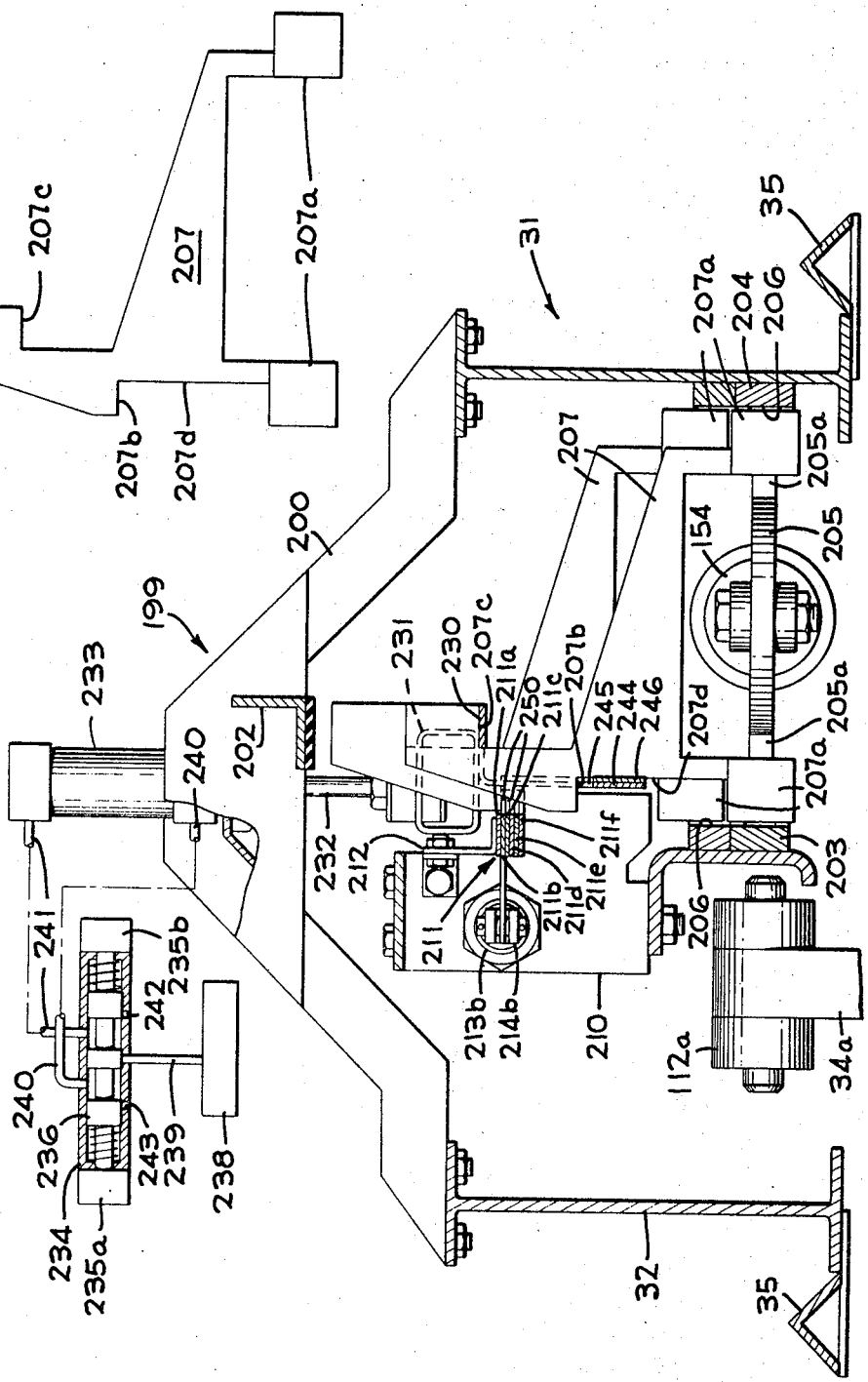

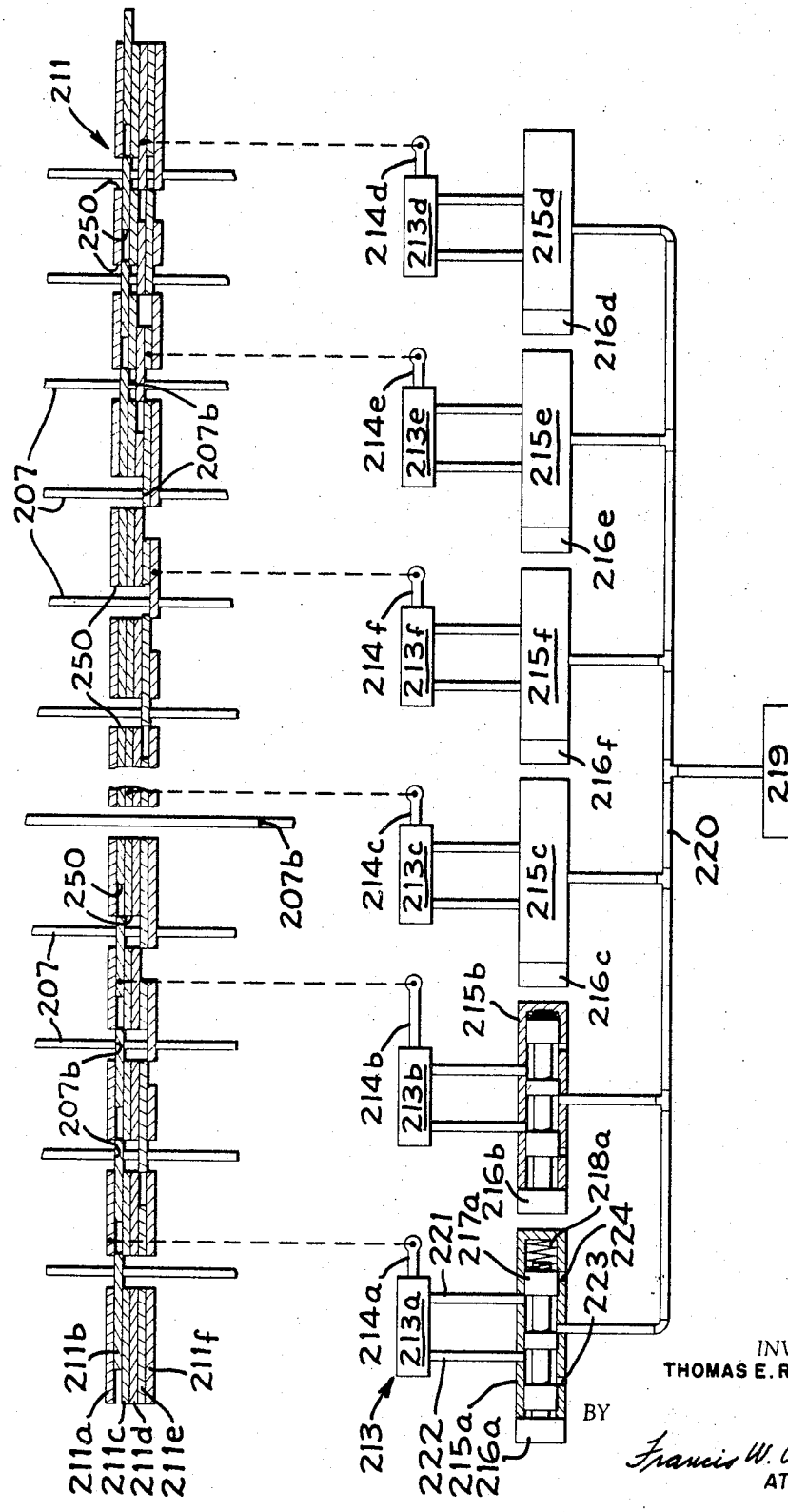

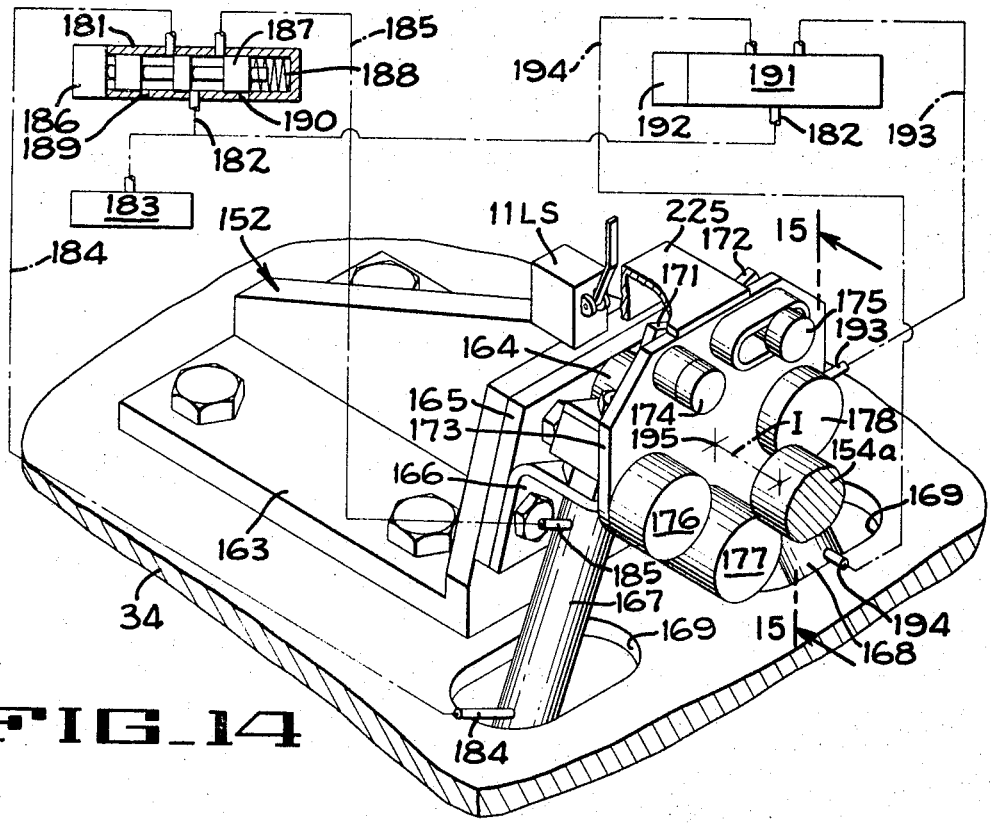
FIG_14
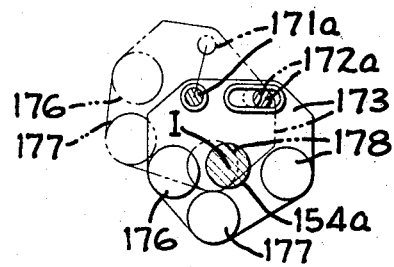
FIG_15A
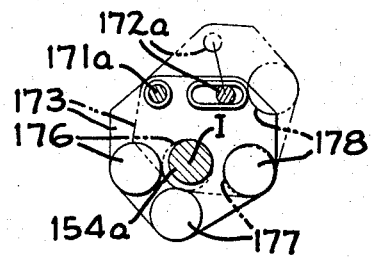
FIG_15B
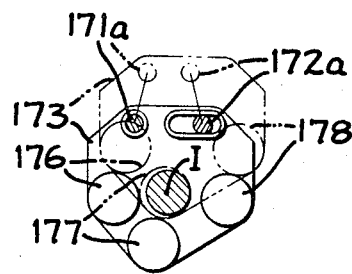
FIG_15C
INVENTOR.
THOMAS E. ROBERTS, JR.
BY Francis W. Anderson
ATTORNEY

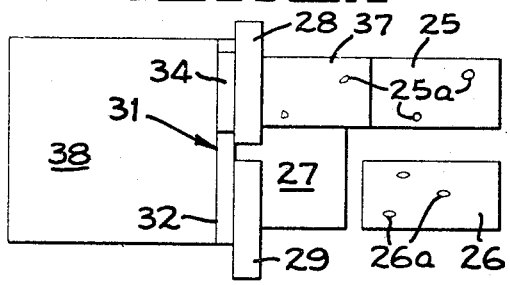
FIG_16A
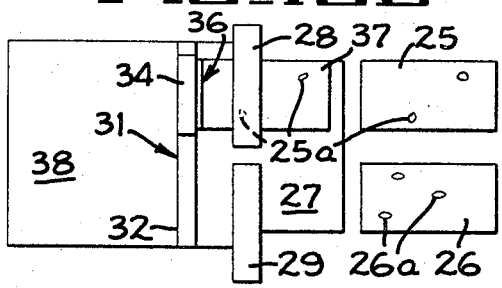
FIG_16B
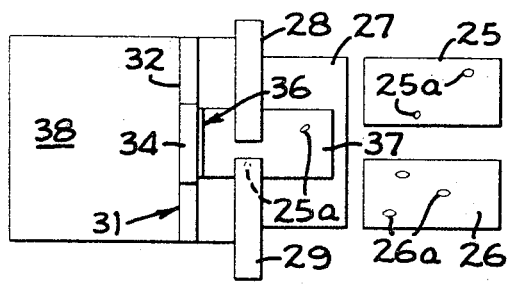
FIG_16C
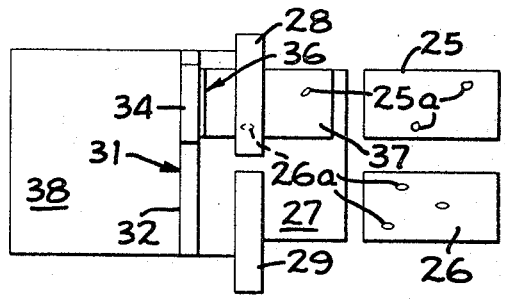
FIG_16D
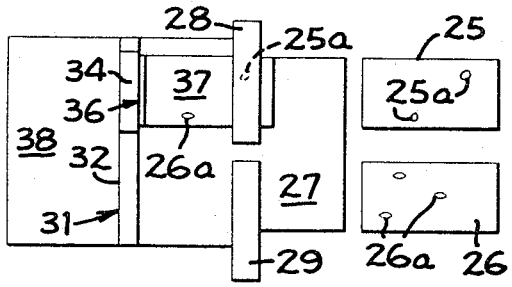
FIG_16E
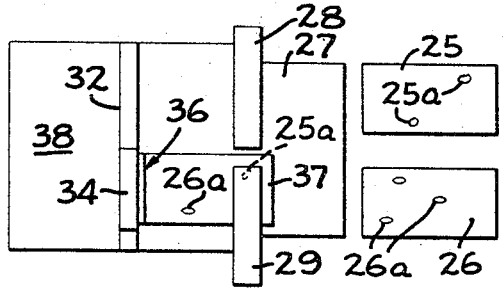
FIG_16F
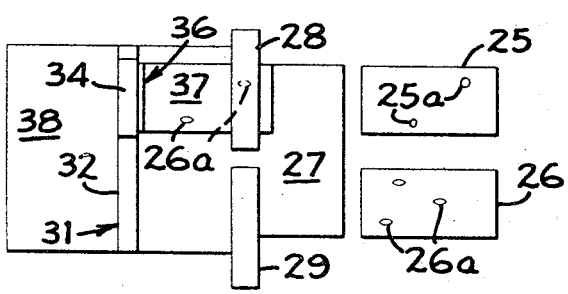
FIG_16G

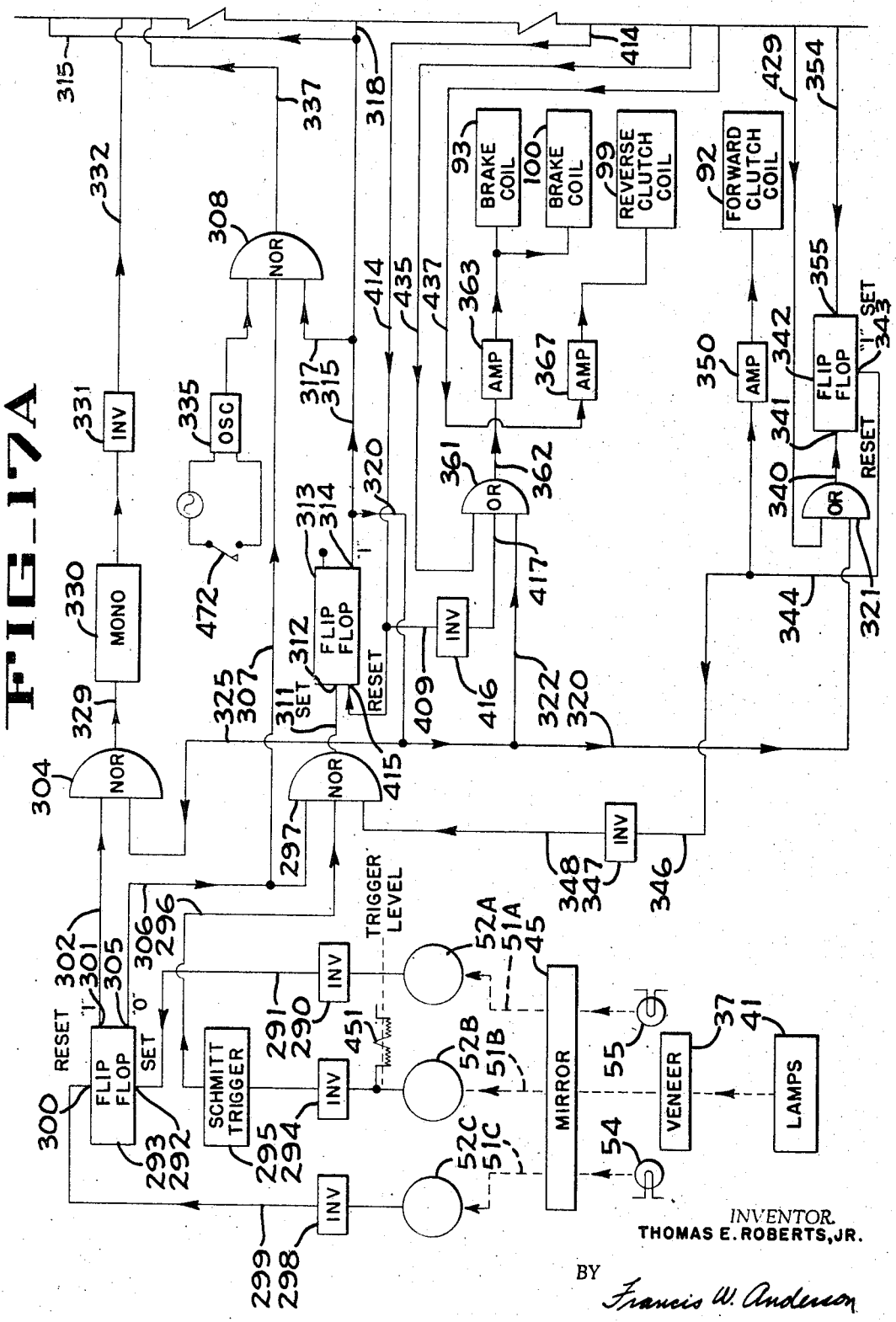

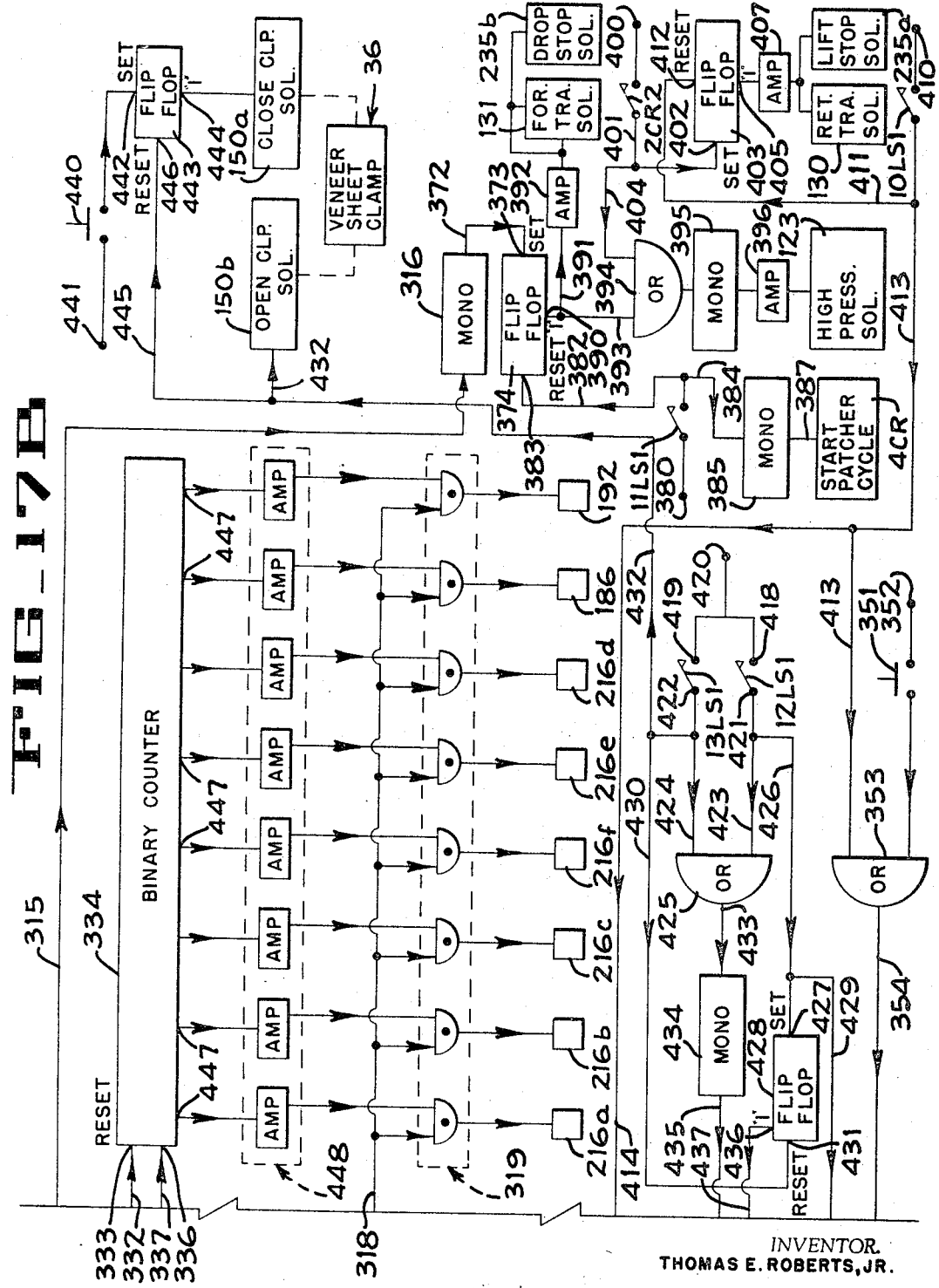

United States Patent Office 3,452,791
Patented July 1, 1969

3,452,791
POSITIONING MECHANISM
Thomas E. Roberts, Jr., Saratoga, Calif., assignor to FMC Corporation, San Jose, Calif., a corporation of Delaware
Filed May 1, 1967, Ser. No. 635,220
Int. Cl. B27m *3/00;* B27d *5/00;* B26d *5/02*
U.S. Cl. 144—2                 14 Claims

ABSTRACT OF THE DISCLOSURE

Plywood veneer, which is scanned as it moves longitudinally in a plywood patching machine, is stopped and shifted on a carriage laterally from the scanner to an automatic patcher. The carriage is stopped, with the defect under the patcher, by two groups of stops, one group on the carriage and one group on the member on which the carriage is mounted. One group has spaced stops to provide a coarse positioning and the other group has stops of different length to provide a fine positioning. A shock absorber is slidably mounted on the carriage between the two groups of stops for impact on both ends by a selected stop of each group as the carriage is stopped.

Cross-reference to related applications

The present application discloses a positioning mechanism incorporated in a machine for automatically detecting and patching plywood veneer sheets. Certain features disclosed in this application are also disclosed in one or more of the following copending applications, filed on even date herewith, and assigned to the same assignee as the present invention:

(1) Ser. No. 634,951, filed May 1, 1967;
(2) Ser. No. 635,238, filed May 1, 1967;
(3) Ser. No. 635,113, filed May 1, 1967;
(4) Ser No. 635,239, filed May 1, 1967; and
(5) Ser. No. 635,221, filed May 1, 1967.

Background of the invention

The present invention relates to positioning mechanism, particularly suitable for an automatic plywood patching machine.

An automatic plywood patching machine has a scanner and has a patcher laterally spaced from the scanner. Plywood sheets are driven longitudinally under the scanner until a defect is detected in the sheet by the scanner. When this occurs, the longitudinal movement of the sheet is stopped and the sheet, which is mounted on a carriage, is shifted laterally toward the patcher. The scanner produces an output corresponding to the lateral position of the defect with respect to a reference point, and the carriage is moved in response to this output to bring the defect under the patcher. After the defect is patched, the carriage is returned to bring the plywood veneer under the scanner again, and scanning is resumed.

Summary of the invention

It is important that the carriage move rapidly to and from the patcher, to minimize the time spent patching each defect, and it is important that the defect be accurately positioned under the patcher by the carriage. The positioning mechanism of the present invention is capable of stopping a rapidly moving carriage accurately in a selected position. Briefly, in the preferred form of the invention, a longitudinal carriage produces longitudinal movement of the sheet under the scanner. A transverse, or cross carriage, is mounted on the longitudinal carriage and carries the sheet laterally to and from the patcher. A first group of spaced stops is mounted on the longitudinal carriage and each is movable between an ineffective position and an effective position. A second group of stops is mounted on the cross carriage, each stop of said second group being of different length. The output from the scanner produces two numerical output signals, one corresponding to a particular stop of the first group and the other corresponding to a particular stop of the second group. In response to these signals, these two stops are rendered effective. A shock absorber is slidably mounted on the cross carriage between the two groups of stops, one end engaging the effective stop of one group and the other stop engaging the effective stop of the other group to bring the moving carriage to rest in a position with the defect under the patcher. The first group of stops, which are spaced a predetermined distance apart, provides a coarse positioning of the cross carriage; the second group of stops, which are of different length, provides a fine positioning of the cross carriage. A second shock absorber cushions the impact as the cross-carriage is returned from the patcher to the scanner.

It is therefore one object of the present invention to provide mechanism for stopping a moving member in a selected position quickly and accurately. It is another object of the present invention to provide mechanism for stopping a carriage at a desired position in an automatic plywood patching machine for patching a defect. It is another object of the present invention to provide mechanism for shifting a carriage laterally from a scanner to a patcher in a plywood patching machine and stopping the carriage quickly and accurately with the defect under the patcher in response to operation of the scanner.

Brief description of the drawings

FIGURE 1 is a view in perspective of an automatic plywood patching machine embodying the present invention;

FIGURE 2 is a view taken on the line 2—2 of FIGURE 1;

FIGURE 3 is a view taken on the line 3—3 of FIGURE 2;

FIGURE 4 is a plan view of machine of FIGURE 1 with the transverse carriage shown in the scan position;

FIGURE 5 is a schematic view of the power mechanism to drive the carriages (with some parts omitted for clarity);

FIGURE 6 is a schematic diagram of the clutch and brake mechanism for the drive motors;

FIGURE 7 is a view taken on the line 7—7 of FIGURE 4, showing the transverse carriage in the scan position;

FIGURE 8 is a view similar to the view of FIGURE 7 except that the transverse carriage is shown in a patch position;

FIGURE 9 is a view taken on the line 9—9 of FIGURE 7;

FIGURE 10 is a view taken on the line 10—10 of FIGURE 8;

FIGURE 11 is a front view of a stop blade;

FIGURE 12 is a view in perspective of part of the lateral positioning mechanism;

FIGURE 13 is a schematic view of the stops and the mechanism for rendering a particular stop effective;

FIGURE 14 is a view in perspective of a part of the lateral positioning mechanism;

FIGURES 15A, 15B and 15C are views taken on the line 15—15 of FIGURE 14, showing in dotted lines various positions of the stops;

FIGURES 16A, 16B, 16C, 16D, 16E, 16F and 16G are schematic diagrams illustrating the successive positions of a plywood sheet as it is shifted laterally for patching in an automatic plywood patching machine; and FIGURES 17A and 17B are electrical diagrams of the machine of FIGURE 1.

Description of the preferred embodiment

There is shown in FIGURE 1 an automatic plywood veneer patching machine incorporating the mechanism of the present invention. A stack 25 of unprocessed plywood veneer sheets (with defects indicated at 25a) and a stack 26 of patched plywood sheets (with patches indicated at 26a) are shown adjacent a table 27 at the front end of the machine. A scanner 28 is positioned over the path of a plywood sheet fed into the machine, and a patcher 29 is located beside the scanner. The machine has a frame 30 which extends behind the scanner and supports a sheet carrier, indicated generally at 31. The sheet carrier comprises a longitudinal carriage 32 (defining a first support) received on spaced apart, longitudinal, parallel ways 33 of frame 30, and a transverse, or lateral, carriage 34 (defining a second support) received on spaced apart, transverse, parallel ways 35 of longitudinal carriage 32. A clamp 36 (see FIGURE 9) mounted on transverse carriage 34 is adapted to grip the leading edge of a plywood veneer sheet 37 for longitudinal movement of the sheet along a longitudinal path (bounded by lines A and B) and for lateral movement of the sheet from said path to the patcher 29 whenever a defect in the sheet 37 is detected by the scanner 28. The frame 30 has a horizontal bed plate 38 mounted thereon which extends under the scanner to table 27. The bed plate 38 lies in the same plane as the top of table 27 and partially supports a sheet 37 gripped by clamp 36.

As shown in FIGURES 1, 2 and 4, the scanner 28 has a housing 40 in the lower end of which two parallel rows of lamps 41 are mounted. The bottom of the housing is open so that the light from lamps 41 is cast downwardly onto a sheet of veneer 37 which is moved by the sheet carrier under the scanner. The scanner has a mirror holder 42 of hexagonal cross-section which is mounted on a bracket 43 connected to the scanner housing 40. The mirror holder 42 is rotated clockwise (as viewed in FIGURE 2) about a central axis C by electric motor 44 which is mounted on bracket 43. Six mirrors 45, mounted on the mirror holder 42, reflect light from the veneer sheet into a sensing member 46.

The sensing member 46, as shown in FIGURE 3, has a housing 47 in the upper end of which a lens 48 is mounted. The lens 48 focuses light from the veneer sheet onto a line on a masking plate 49 which is mounted in housing 47. The line on which the light focuses extends in the direction of plywood veneer travel (that is, longitudinally) and the masking plate has three apertures 50A, 50B, 50C on that longitudinal line. The light which passes through the center aperture 50B (designated as light path 51B) strikes a photomultiplier tube 52B behind the masking plate and in line with aperture 50B. Two prisms 39a, 39b are secured to the rear of the masking plate over apertures 50A and 50C to direct the light (designated as light paths 51A and 51C, respectively), passing through those apertures to the photomultiplier tubes 52A and 52C, which are behind the masking plate but not in line with the apertures 50A and 50C.

With this arrangement, light from three small spots 53A, 53B, 53C (each, say, 3/16 of an inch in diameter), as shown in FIGURE 4, on the veneer sheet is reflected at any given instant by one of the mirrors 45 through the three apertures to act, respectively, on the three light sensitive detectors defined by the three photomultiplier tubes 52A, 52B and 52C. Since the three apertures on the masking plate 49 are spaced apart in the longitudinal direction (say, for example, 1/8 inch between each aperture) the three spots seen at any instant by the photomultiplier tubes will be longitudinally spaced, say two inches apart. Since the electric motor 44 runs continuously during operation of the machine the photomultiplier tubes sense successive spots laterally across the veneer sheet (from right to left as viewed in FIGURE 2). After one mirror has completed one lateral pass across the veneer sheet, the next mirror begins the next pass, so that on each rotation of the mirror holder, six lateral passes are made across the sheet. The veneer sheet will have moved longitudinally from the beginning of one pass to the beginning of the next pass (say, for example, a distance of 0.04 inch) so that successive lateral scans, or passes, will be longitudinally displaced, and, therefore, the entire veneer sheet will be scanned. It should be noted that the scanning spot size is such that the lateral passes, although longitudinally displaced one from the other, overlap so that the entire surface of the sheet 37 (except the edges which cannot be patched) will be scanned for defects.

Two lamps 54 and 55 are mounted in the scanner housing 40. Lamp 54 is mounted in an imaginary line D extending between the axis C of rotation of the mirror holder 42 and the left edge of a sheet 37 (as viewed in FIGURE 2) passing under the scanner. Lamp 55 is mounted in an imaginary line E extending between the axis C of rotation of the mirror holder 42 and the right edge of a sheet 37 (as viewed in FIGURE 2) passing under the scanner. As shown best in FIGURE 4, lamp 55 is in light path 51A at the beginning of a lateral pass across the veneer sheet and lamp 54 is in light path 51C at the end of a lateral pass across the veneer sheet. Lamp 55 acts only on photomultiplier tube 52A and lamp 54 acts only on photomultiplier tube 52C. Lamp 55 acts as an indicator which establishes a fixed reference point at the beginning of each scanning pass and lamp 54 acts as an indicator which establishes a fixed reference point at the end of each scanning pass. Effective scanning occurs only between the boundaries E, D defined by the lamps 55, 54. It is only photomultiplier tube 52B which senses the condition of the veneer, which it does by responding to the different character of the light reflected from a defect to produce a signal.

As shown in FIGURE 1, the longitudinal carriage 32 has four flanged rollers 70 which ride on the tracks, or ways, 33. As shown best in FIGURE 5, one end of a chain 71 on each side of carriage 32 is connected to the rear of the carriage 32, and the other end of the chain is connected to the front of the carriage 32. Each of the two chains 71 is received over a sprocket 72 mounted on the rear of the frame 30 and over a sprocket 73 mounted on the front of the frame 30. Each sprocket 72 is connected by stub shaft 74 to sprocket 75 which receives a chain 76. A shaft 77, journaled in the frame 30, has two sprockets 78 secured thereon which receive, respectively, the chains 76. The shaft 77 also has two sprockets 79 secured thereon which are connected, respectively, by chains 80 to sprockets 81.

As shown best in FIGURE 6, one of the sprockets 81 is mounted on shaft 84 which extends through brake 85 to clutch 86. The brake and clutch have plates 87, 88, respectively, which are keyed to shaft 84 for rotation therewith. An electric motor 89, which may be designated a forward motor, is connected to the other clutch plate 90 by shaft 91. When the electromagnet 92 in clutch 86 is energized (and the electromagnet 93 in brake 85 deenergized) the clutch plates are drawn together and motor 89 is coupled to the longitudinal carriage 32 by the drive train defined by shaft 91, clutch 86, shaft 84, sprocket 81, chain 80, sprocket 79, shaft 77, sprocket 78, chain 76, sprocket 75, shaft 74, sprocket 72, and chain 71. When the electromagnet 93 in brake 85 is energized (and the electromagnet 92 deenergized) the plate 87 is engaged with the stationary brake housing 94 to stop rotation of shaft 84, and hence stop the forward movement (indicated by arrow F in FIGURE 4) of longitudinal carriage 32.

The other sprocket 81 is mounted on shaft 95 which extends through brake 96 to clutch 97. The shaft 95 is coupled to electric motor 98, which may be designated a reverse motor, when electromagnet 99 in clutch 97 is energized (and electromagnet 100 in brake 96 is deenergized), to move the carriage 32 in the directional sense indicated in FIGURE 4 by arrow G. When electromagnet 100 in brake 96 is energized, and electromagnet 99 in clutch 97 is deenergized, rotation of shaft 95 is stopped to stop carriage 32.

As shown best in FIGURES 5 and 9, the transverse carriage 34 has flanged rollers 110 received on the transverse tracks, or ways, 35 of longitudinal carriage 32, and the carriage 34 is suspended from these rollers to extend under the carriage 32. A cylinder 111, which is mounted on longitudinal carriage 32, has a piston (not shown) received therein. The piston is connected to a connecting rod 112 which has a clevis 112a connected to a bracket 34a mounted on the transverse carriage 34. A source 113 of air under pressure is connected by line 114 to the inlet of a pressure regulating valve 115 having an outlet connected to line 116. The outlet pressure of valve 115 is adjustable by member 117, and the pressure at the outlet is set at a high value of, say, 80 p.s.i. Line 116 is connected to the inlet of a second pressure regulating valve 118 which has an outlet connected to line 119. The outlet pressure of valve 118 is adjustable by member 120, and the pressure at the outlet is set at a low value of, say, 40 p.s.i. A blocking valve 121 has an inlet connected to line 116 and an outlet connected to line 119. When the shiftable valve member 122 of valve 121 is in the position shown in FIGURE 5, air through the valve is blocked. When solenoid 123 of the valve 121 is energized to shift valve member 122 to the right (as viewed in FIGURE 5), air from line 116 passes through the valve 121 to line 119 to bypass pressure regulating valve 118.

Line 119 is connected to the pressure port of valve 124. The valve 124 has two exhaust ports 125, 126 open to the atmosphere, and has two motor ports connected to motor lines 127, 128. Motor line 127 is connected to one end of cylinder 111 and motor line 128 is connected to the opposite end of cylinder 111. Valve 124 has a shiftable valve member 129 connected at one end to solenoid 130 and connected at the opposite end to solenoid 131. When solenoid 130 is energized (and solenoid 131 deenergized) to shift valve member 129 to the right (as viewed in FIGURE 5), air from line 119 passes through the valve 124 to line 127 to move the carriage to the left (as viewed in FIGURE 5). Air from the left end of the cylinder 111 is vented to the atmosphere through line 128, valve 124, and exhaust port 126. When solenoid 131 is energized (and solenoid 130 deenergized) to shift valve member 129 to the left (as viewed in FIGURE 5), air from line 119 passes through the valve 124 to line 128 to move the carriage to the right. Air from the right end of the cylinder is vented to the atmosphere through line 127, valve 124, and exhaust port 125.

The pressure in line 116 is maintained at 80 p.s.i. by valve 115. The pressure in line 119 is held at 40 p.s.i. by valve 118, but only while valve 121 prevents communication between lines 116 and 119. When solenoid 123 is energized and valve 121 opens to connect line 116 to 119, the pressure in line 119 will rise to 80 p.s.i. A high pressure is initially applied to one end or the other of cylinder 111 to accelerate the carriage 34 rapidly. After the carriage has been accelerated, solenoid 123 is deenergized to drop the pressure to facilitate stopping the carriage. Thus, the carriage is moved in the minimum elapsed time from one position to another position.

As shown best in FIGURES 7, 8 and 9, the clamp 36, which grips the leading edge of a sheet 37 of plywood veneer, is suspended beneath the carriage 34. The clamp has a fixed jaw 140 extending along one edge of the carriage, and a movable jaw 141 pivotal about an axis H. Two cylinders 142, mounted beneath the carriage 34, have pistons (not shown) which are connected by connecting rods 143 to the movable jaw. A source 144 of air under pressure is connected by pressure line 145 to the pressure port of pneumatic valve 146. Motor line 147 extends from the valve 146 to one end of both cylinders 142 and motor line 148 extends from the valve 146 to the other end of both cylinders 142. Movable valve member 149 is connected at one end to solenoid 150a and at the opposite end to solenoid 150b. When solenoid 150a is energized to shift valve member 149 to the right (as viewed in FIGURE 9), air under pressure passes from the source 144 through valve 146 to line 147. This pressure advances the piston (and connecting rod 143) to swing the movable jaw closed. Air in front of the piston is expelled through line 148, valve 146, and out exhaust port 148a. When solenoid 150b is energized to shift valve member 149 to the left (as viewed in FIGURE 12), air under pressure is introduced to line 148 to retract the piston (and connecting rod 143) to swing jaw 141 open. Air behind the piston is vented through line 147, valve 146, and discharge port 147a.

As shown best in FIGURES 7 and 8, two stops 151, 152 are mounted back to back on the upper surface of the transverse carriage 34. Stop 151 engages the plunger 153a of a shock absorber 153 when the carriage 34 is moved to the left (as viewed in FIGURES 7 and 8) from the patcher back to the scan path. The shock absorber 153 is mounted on the longitudinal carriage 32 and the plunger 153a thereof decelerates the carriage 34 when the carriage 34 is rapidly returned from the patcher to bring the carriage to a stop (when the plunger 153a is fully retracted as shown in FIGURE 7). With the carriage 34 in this position, a plywood sheet 37 gripped thereby will be in the scanning path between lines A and B (FIGURE 1). The stop 151 has a hard rubber pad 151a secured thereon which is engaged by the disc 153c on the plunger 153a of shock absorber 153. Stop 152 engages an abutment block 154a of a shock absorber 154 which has flanges 155 on each side slidably received in guides 156 (see FIGURE 12). The guides 156 are secured on the carriage 34, and the shock absorber 154 is shiftable on the carriage with respect to the fixed guides 156 between a position to the left (as shown in FIGURE 8) with block 154a in engagement with stop 152, and a position to the right, as shown in FIGURE 7. Springs 157 on each side of the shock absorber are connected under tension between studs 158 on the carriage 34 and flanges 155 on the shock absorber to urge the shock absorber away from stop 152.

Stop 152, as shown in FIGURE 14, has a base 163 bolted to transverse carriage 34. The base has a cylindrical hard rubber block 164 mounted on plate 165 which is secured to base 163. Two cylinders 167, 168, which extend through openings 169 in carriage 34, are connected to the plate 165 by clips 166. The cylinders have pistons (not shown) which are secured to connecting rods (not shown). The connecting rods are secured to clips 171, 172 which have pins 171a, 172a, respectively, extending therefrom. A plate 173 has a hole and a slot, each surrounded by a skirt, which receive, respectively, the two pins of clips 171, 172. Heads 174, 175 secured, respectively, to the two pins, holds the plate 173 on the two pins, in abutting relationship with block 164. The plate 173 has secured thereon abutment blocks 176, 177 and 178 spaced around the edge of the plate.

The abutment block 154a of shock absorber 154 lies in a horizontal axis I. The plate 173, which is supported solely by the pins 171a, 172a on clips 171, 172, assumes a position in accordance with the operation of the cylinders 167, 168. A valve 181 has a pressure port connected by pressure line 182 to a source 183 of air under pressure. Two motor ports in the valve are connected, respectively, to motor lines 184, 185 which lead, respectively, to the bottom and top of cylinder 167. A solenoid 186 is connected to one end of a movable valve member 187 which is urged, when solenoid 186 is deenergized, to the left (as viewed in FIGURE 14) by spring 188. When the valve is to the left, as shown, air under pressure passes through the valve to motor line 185 and into the cylinder 167 above the piston (not shown) therein. Air beneath the piston is vented to the atmosphere through line 184, valve 181, and exhaust port 189. When solenoid 186 is energized and the valve member 187 is shifted to the right, air under pressure from line 182 passes through the valve to motor line 184, which is connected to cylinder 167 below the piston. Air from above the piston is vented to the atmosphere through line 185, valve 181, and exhaust port 190 thereof.

A valve 191, identical to valve 181, has a solenoid 192. When solenoid 192 is deenergized, air under pressure from pressure line 182 is directed through the valve to motor line 193, which is connected to cylinder 168 above the piston (not shown) therein. When solenoid 192 is energized, air under pressure from pressure line 182 is directed to motor line 194 which is connected to cylinder 168 below the piston therein.

The plate 173 can assume four different positions, depending on the operation of valves 181, 191 and the resulting operation of the actuators defined by cylinders 167, 168. When neither solenoid is energized, and both pistons are therefore down, the plate 173 assumes the position shown in FIGURE 14 with the center of the plate (indicated at 195) in axis I in an effective stopping position in line with the abutment block 154a of shock absorber 154. The blocks 176, 177, 178 are all in ineffective stopping positions. When solenoid 186 is energized, and solenoid 192 deenergized, the pin 171a is raised to shift the plate 173 (about the pin 172a of clip 172) to the position shown in dotted lines in FIGURE 15A. In this position, abutment block 178 alone is in an effective position in axis I. When solenoid 192 is energized, and solenoid 186 is deenergized, pin 172a is raised to shift the plate 173 (about the pin 171a of clip 171) to the position shown in dotted lines in FIGURE 15B. In this position, the block 176 is swung into axis I in line with abutment block 154a of shock absorber 154. When both solenoids 186 and 192 are energized, both pins 171a, 172a are raised to raise plate 173 to the position shown in dotted line in FIGURE 15C. In this position, block 177 is in axis I in line with abutment block 154a.

A group of stop blades, indicated generally at 199, is mounted on the longitudinal carriage 32 to control the lateral position of carriage 34. The adjustable stop 152, and the group of stops 199, define lateral positioning mechanism which operates in response to data from the scanner to stop the carriage 34 with the defect in the plywood sheet under the patcher. A pair of spaced arches 200, 201 (see FIGURE 1) are mounted on the longitudinal carriage 32 and have a transversely extending angle member 202 extending therebetween. A pair of spaced elongated guide tracks, 203, 204, as shown best in FIGURE 9, are connected to carriage 32 and extend transversely below member 202. The guide tracks 203 and 204 receive a bumper 205 therein which is connected, as shown in FIGURES 7 and 8, to the front of the plunger 154b of shock absorber 154. The guide tracks 203 and 204 each have a plurality of vertical slots 206 (see FIGURES 7, 8 and 12) each of which receives a stop blade 207. The stop blades 207, which define coarse positioning mechanism for carriage 34, are spaced apart farther than the difference between the shortest stop 195 and the longest stop 177 of stop mechanism 152 which defines fine positioning mechanism for carriage 34. Each blade 207, which is shown in FIGURE 11, has depending legs with thicker feet 207a which define stops for engagement by shoulders 205a of bumper 205 when the blade shifts to an effective position. When the shoulders 205a of bumper 205 engage a particular stop as shown in FIGURE 8, the plunger 154b retracts and decelerates the transverse carriage 34 on which shock absorber 154 is mounted. The carriage 34 will be stopped in a particular lateral position defined by the particular stop. There are a plurality of stops 207 (sixty-four, for example) which normally are held in a raised ineffective position out of the path of bumper 205. Each blade, however, can be selectively dropped to an effective stopping position where the blade defines a stop for carriage 34 at a particular position, depending on the blade selected.

As shown best in FIGURE 10, a series of spaced vertical plates 210 are connected to longitudinal carriage 32. A plurality of selector bars 211 (designated 211a, 211b, 211c, 211d, 211e and 211f) are supported by the plates 210 and clips 212 secured to the plates. Cylinders 213 (designated 213a, 213b, 213c, 213d, 213e and 213f) defining actuators, one for each selector bar (see FIGURE 13), are mounted between the plates 210. Each cylinder has a piston (not shown) which is connected to a connecting rod (214a, 214b, 214c, 214d, 214e and 214f). Valves 215a, 215b, 215c, 215d, 215e, and 215f have solenoids 216a, 216b, 216c, 216d, 216e and 216f, respectively. When solenoid 216a is deenergized, valve member 217a is urged to the left by spring 218a. Air under pressure from source 219 passes through pressure line 220 to the pressure port of the valve. Air under pressure passes through the valve to motor line 221, connected to a motor port of the valve. Line 221 is connected to one end of the cylinder 213a, on one side of the piston therein. Air behind the piston is vented through motor line 222, through the valve, to exhaust port 223. When solenoid 216a is energized and the valve member 217a is shifted to the right, air from pressure line 220 passes through the valve to line 222 to move the piston to the right (as viewed in FIGURE 13) and extend the connecting rod thereof. Air from in front of the piston is vented through line 221, valve 215a, and exhaust port 224 thereof.

For purposes of illustration, assume there are sixty-four stop blades 207 each received in one opposing pair of vertical slots 206 in the guides 203 and 204. The vertical slots are equally spaced in the lateral direction (as shown in FIGURE 12) so the blades 207 are equally spaced in the lateral direction. All of the blades 207 are identical and each has a shoulder 207b (see FIGURE 11). The blades are shiftable vertically, and when all the blades are in their upper positions, the shoulders 207b extend over the group of selector bars 211. The blades are raised to their upper position by a laterally extending bar 230 (FIGURE 10) which is secured, at each end, to a short tube 231. Each tube 231 is secured to a connecting rod 232 of a piston (not shown) slidably received in cylinder 233. A valve 234 has solenoids 235a and 235b which are connected to a shiftable valve member 236. When the solenoid 235a is energized and solenoid 235b deenergized, the valve member 236 is shifted to the right (as viewed in FIGURE 10). With valve member 236 to the right, air under pressure from a source 238 passes through pressure line 239 to the pressure port of the valve. The air under pressure passes through the valve to motor line 240 which is connected to the lower end of cylinder 233, below the piston therein. Air from above the piston is vented through motor line 241, through the valve, and out exhaust port 242. When the solenoid 235b is energized and solenoid 235a deenergized, the valve member 236 is shifted to the left and air from pressure line 239 passes through the valve to motor line 241. Air below the piston is vented through motor line 240, valve 234, and exhaust port 243. When the valve is operated to raise the pistons and connecting rods 232, bar 230 engages shoulders 207c on the blades to raise all the blades in unison. A plate 244, connected to the tubes 231 and extending therebetween, depends vertically from the tubes. The plate 244 has a plurality of guide slots 245 which receive the stop blades 207. The plate has a transverse wear strip 246 which engages the vertical side 207d of the blade. When the valve is operated to lower the pistons and connecting rods 232, strip 246 urges the blades downwardly.

Each selector bar 211a to 211f has sixty-four solts 250 positioned in accordance with a binary code to permit one stop only to be effective in any position of the six selector bars. It will be noted from FIGURE 13 that each selector bar assumes one of two possible positions, depending on whether the solenoid 216a to 216f of the valve 215a to 215f controlling the selector bar cylinder 213a to 213f is energized or deenergized. The slots of each bar are positioned so that thirty-two of the slots are aligned with the blades 207 and thirty-two are displaced from the stop blades 207 in one position of the bar. When the bar is shifted to the other position, the thirty-two slots which were aligned with the blades are displaced therefrom and the thirty-two slots which were displaced from the blades are aligned with the blades. When a slot in a selector bar is aligned with a stop blade, that bar will permit the blade to drop through that particular bar; when a slot in a bar is displaced from a blade, the shoulder 207b of the blade will engage the bar and prevent the blade from dropping beyond that bar. Any blade which is blocked by any bar, will not fall into the path of bumper 205. A blade which is aligned with slots in all the bars will fall into the path of bumper 205 to define the stopping position of lateral carriage 34.

When all the bars are in, say, the left hand position (as viewed in FIGURE 13) as are bars 211a, 211c, 211d, 211e and 211f, one of the bars 211a will have the first thirty-two slots 250 (considered from left to right) aligned with the blades 207 and the last thirty two slots displaced from the blades. Another bar, 211c, will have the first sixteen slots aligned with the blades, the next sixteen slots displaced from the blades, the next sixteen slots aligned with the blades, and the last sixteen slots displaced from the blades. One bar, 211d, will have the first eight slots aligned with the blades, the second eight slots displaced from the blades, with alternate sets of eight slots aligned with and displaced from the blades. One bar, 211b (which is shown in the extreme right hand position), will, when in the left hand position, have the first four slots aligned with the blades, the second four slots displaced from the blades, and alternate sets of four slots aligned with and displaced from the blades. Another bar, 211f, will have tthe first two slots aligned with the blades, the next two slots displaced from the blades, and alternate sets of two slots aligned with and displaced from the blades. One bar, 211e, will have the first, third, fifth and every other slot aligned with the blade and will have the second, fourth, sixth, and all alternate slots displaced from the blades.

With this binary coded arrangement of slots 250 on the six selector bars 211a to 211f, there are sixty four different possible arrangements of the six selector bars, and each arrangement will result in alignment of all the slots at one blade only to permit one, and only one, of the sixty four blades 207 to drop into the path of the bumper 205. Since each of the blades occupies a different lateral position on the longitudinal carriage 32, each blade will stop the carriage 34 (on which the shock absorber 154 is mounted) in a different lateral position.

The final lateral position of the lateral carriage 34, however, does not depend only on which stop blade 207 is dropped. A finer adjustment of final lateral position of the carriage is possible. It will be noted from FIGURE 7 that the shock absorber 154, which is shiftable on carriage 34, is normally held to the right by spring 157 when lateral carriage 34 moves to the right to the desired patch position, until the bumper 205 engages the selected blade 207. The carriage 34 does not stop at this instant but continues to the right while shock absorber 154 remains stationary. When the selected abutment surface (195, 176, 177, 178) mounted on stop 152 (FIGURE 14) engages the stop block 154a on shock absorber 154, the carriage 34 will come to rest. Thus, the final position of carriage 34 depends both on the selection of a stop of particular length on stop 152 and the selection of a particular stop 207 in a particular lateral position.

The patcher 29 is a conventional machine of the type shown, for example, in U.S. Patent 2,336,704, issued to P. F. Skoog on Dec. 14, 1943. As described in that patent, the machine is operable automatically to cut a defect out of a sheet of plywood veneer, cut a patch from a patch blank to fit the opening from which the defect was cut, and insert the patch in the opening. The machine has a clamping shoe which is actuated by the introduction of air under pressure into a chamber to clamp down on the plywood veneer sheet and hold the veneer sheet over a fixed die. A knife, which is actuated by a pneumatically actuated diaphragm, descends inside the clamping shoe to cut the defect out of the plywood veneer. A pressure foot, which is actuated by the introduction of air under pressure into a cylinder, forces the cut out defect out of the veneer sheet. A patch blank is shifted into registration with the die by a carrier bar which is moved in one direction or the other by the introduction of air to one end or the other of a cylinder. A ram, which is actuated by a pneumatically operated diaphragm, is raised to force the patch blank through the die, thereby trimming the blank to size. The ram inserts the trimmed blank into the opening in the veneer sheet from which the defect was removed.

Limit switch 11LS is mounted on the base 163 of stop 152, as shown in FIGURE 14. Plate 173 has mounted thereon a bracket 255 with a depending lip normally in closely spaced relation to the plunger of limit switch 11LS in any vertical position of plate 173. When the transverse carriage 34 is stopped in the patch position by one of the stops 207, the rubber block 164 deflects and limit switch 11LS is momentarily operated. Operation of limit switch 11LS closes contacts 11LS1 to trigger monostable circuit 385 (see FIGURE 17B) which energizes a relay 4CR to start the patcher cycle. At the end of the operating cycle of the patcher 29, a relay (not shown) is energized to close normally open contacts 2CR2 thereof (see FIGURE 17B) and signal the end of the operating cycle of the patching machine.

As shown in FIGURE 17A, the photomultiplier tube 52A responds to light from lamp 55 which is reflected from the rotating mirror onto the tube 52A to indicate the beginning of a scanning pass across the board. Photomultiplier tube 52A is connected to inverter 290 which is connected by line 291 to the input set terminal 292 of flip-flop 293. Photomultiplier tube 52B is connected to inverter 294 which is connected to Schmitt trigger circuit 295. A signal from trigger circuit 295 is transmitted by line 296 to an input terminal of NOR gate circuit 297. Photomultiplier tube 52C is connected to inverter 298 which is connected by line 299 to the input reset terminal 300 of flip-flop 293. The photomultiplier tubes 52A, 52B, and 52C have circuitry to produce a negative voltage of magnitude proportional to light intensity. The output terminal 301 of flip-flop 293 (marked with a "1" to indicate a positive voltage output when a positive voltage is applied to the set input terminal 292) is connected by line 302 to an input terminal of NOR gate circuit 304. The other output terminal 305 of flip flop 293 (marked with a 0 to indicate no positive voltage output when a positive voltage input is applied to the set input terminal) is connected by line 306 to an input terminal of NOR gate circuit 297. The output terminal 305 is also connected by line 307 to an input terminal of NOR gate circuit 308.

The output terminal of NOR gate circuit 297 is connected by line 311 to the input set terminal 312 of flip-flop 313. Only output terminal 314 of flip-flop 313 is utilized, and that terminal is connected by line 315 to the input terminal of monostable, or one shot, circuit 316 (see FIGURE 17B), by line 317 to an input terminal of NOR circuit 308, by line 318 to a plurality of AND circuits, indicated as a group 319, by line 320 to an input terminal of an OR circuit 321, by line 322 to an input terminal of OR circuit 361, and by line 325 to an input terminal of NOR circuit 304. Monostable circuit 316, upon receiving a signal from output terminal 314, produces a single pulse of 150 milliseconds' duration.

There are eight AND circuits in group 319, six of which have output terminals connected to solenoids 216a, 216b, 216c, 216d, 216e and 216f which are the solenoids of the valves controlling the position of the six selector bars 211a, 211b, 211c, 211d, 211e and 211f. Two of the AND circuits of group 319 have output terminals connected to solenoids 186 and 192 which are the solenoids of the valves controlling operation of stop 152.

The output of NOR circuit 304 is connected by line 329 to the input terminal of monostable circuit 330 which, when receiving a signal from NOR circuit 304, will produce a single pulse of 0.1 millisecond. The output terminal of circuit 330 is connected to an inverter 331 which is connected by line 332 to the reset terminal 333 of a ten stage binary counter circuit 334. The output terminal of an oscillator 335 is connected to the input terminal of NOR circuit 308. The output terminal of NOR circuit 308 is connected by line 337 to the input terminal 336 of counter circuit 334.

The output terminal of OR circuit 321 is connected by line 340 to the reset input terminal 341 of flip-flop 342. The only output terminal utilized, terminal 343, is connected by line 344 to the input terminal of amplifier 350. The output terminal 344 of flip-flop circuit 342 is also connected by line 346 to an inverter 347 which, in turn, is connected by line 348 to an input terminal of NOR circuit 297. The output terminal of amplifier 350 is connected to forward clutch coil 92. A start switch 351 is connected between a source 352 of positive voltage and an input terminal of OR circuit 353. The output terminal of circuit 353 is connected by line 354 to the set input terminal 355 of flip-flop 342.

The output terminal of OR circuit 361 is connected by line 362 to the input terminal of amplifier 363, the output terminal of which is connected to brake coils 93 and 100 (FIGURE 6).

The output of monostable circuit 316 is connected by line 372 to the input set terminal 373 of flip-flop circuit 374. A source of voltage 380 is connected to one contact of contacts 11LS1 of limit switch 11LS (FIGURE 14), the opposite terminal of which is connected by line 382 to the reset input terminal 383 of flip-flop circuit 374 and by line 384 to the input terminal of monostable circuit 385. The output terminal of monostable circuit 385, which produces a pulse of 0.1 second duration on receipt of a signal at the input terminal thereof, is connected by line 387 to relay 4CR. Switch contacts (not shown) of relay 4CR close when relay 4CR is energized to start the patcher machine cycle.

The output terminal 390 of flip-flop 374 is connected by line 391 to the input terminal of amplifier 392 and by line 393 to an input terminal of OR circuit 394. The output terminal of amplifier circuit 392 is connected to the forward traverse valve solenoid 131 (FIGURE 5) and to the drop stop solenoid 235b (FIGURE 10). The output of OR circuit 394 is connected to monostable circuit 395 which produces an output pulse of 0.1 second duration when a voltage signal is received from the OR circuit 394. The output of monostable circuit 395 is connected to the input terminal of an amplifier 396, the output terminal of which is connected to high pressure valve solenoid 123 (FIGURE 5).

One contact of normally open contacts 2CR2 of a relay (not shown) which is energized momentarily at the end of the patching machine cycle is connected to a source 400 of positive voltage and the other contact is connected through line 401 to the set input terminal 402 of flip-flop 403, and through line 404 to an input terminal of OR circuit 394. The output terminal 405 of flip-flop circuit 403 is connected to the input terminal of amplifier 407. The output terminal of amplifier 407 is connected to return traverse valve solenoid 130 (FIGURE 5) and to lift stop solenoid 235a (FIGURE 10).

One contact of the normally open contacts 10LS1 of limit switch 10LS (FIGURE 7) is connected to a source 410 of voltage. The other contact thereof is connected through line 411 to the reset input terminal 412 of flip-flop 403, through line 413 to an input terminal of OR circuit 353, through line 414 to reset input terminal 415 of flip-flop 313, and through line 409 to the input terminal of inverter 416. The output terminal of inverter 416 is connected by line 417 to an input terminal of OR circuit 361.

One contact 418, 419, respectively, of each of the normally open limit switch contacts 12LS1 and 13LS1 (FIGURE 4) are connected to a source 420 of positive voltage. The opposite contacts 421, 422 of switches 12LS and 13LS are connected, respectively, by lines 423, 424 to input terminals of OR circuit 425. The contact 421 is also connected by line 426 to the set input terminal 427 of flip-flop 428, and by line 429 to an input terminal of OR circuit 321. Contact 422 is connected by line 430 to the reset input terminal 431 of flip-flop 428, and by line 432 to the open clamp valve solenoid 150b (FIGURE 9). The output terminal of OR circuit 425 is connected by line 433 to the input terminal of monostable circuit 434. The output terminal of circuit 434 is connected by line 435 to an input terminal of OR circuit 361. The output terminal 436 of flip-flop circuit 428 is connected by line 437 to the input terminal of amplifier circuit 367, the output terminal of which is connected to a reverse clutch coil 99 (FIGURE 6).

A manually operated switch 440 is connected between a source 441 of positive voltage and the set terminal 442 of flip-flop circuit 443. The output terminal 444, which is the only output terminal of the circuit utilized, is connected to the close clamp solenoid 150a (FIGURE 9). Terminal 422 of switch 13LS is connected by line 445 to the reset terminal 446 of flip-flop circuit 443.

The output terminals 447 of the binary counter 334 are connected to amplifiers 448 which, in turn, are connected to an input terminal of AND circuits 319. The output terminal and AND circuits 319 are connected, respectively, to the selector bar valve solenoids 216a, 216b, 216c, 216d, 216e and 216f (FIGURE 13), and stop solenoids 186 and 192 (FIGURE 14). Any particular count in the counter 334 will produce a unique pattern of voltage at some terminals, and no voltage at other terminals 447. This pattern defines a numerical output which can be considered as made up of two numerical outputs, one to control the solenoids 186, 192 of the fine positioning mechanism 152 and the other to control the solenoids 216a to 216f, inclusive, of the coarse positioning mechanism 199.

The approach of the longitudinal carriage 32 to the two extreme positions is indicated by the two limit switches 12LS and 13LS, as shown in FIGURE 4. Dog 450 extends from one side of the longitudinal carriage 32. Limit switch 12LS is connected to the rear of the frame 30 for momentary operation by dog 450 when the carriage 32 approaches the extreme rearward position (with the trailing edge of a sheet of plywood veneer gripped by clamp 36 under the scanner). Limit switch 13LS is connected to the front of the frame 30 for momentary operation by dog 450 when the carriage 32 approaches the extreme front position (with the clamp 36 and the leading edge of a sheet of plywood veneer received therein under the scanner). In both instances, the momentum of the carriage 32 carries the dog 450 past the limit switch. Both limit switches 12LS and 13LS are of the type which are operated (to actuate the contacts thereof) when tripped in one direction only; tripping in the opposite direction will have no effect on the contacts. The contacts of switch 13LS are actuated only as the dog 450 moves from left to right in FIGURE 4; the contacts of limit switch 12LS are actuated only as the dog 450 moves from right to left in FIGURE 4.

The two extreme lateral positions of the transverse carriage 34 are indicated by the two limit switches 10LS (FIGURE 7) and 11LS (FIGURE 14). When the carriage 34 reaches the extreme left hand, or scan, position on carriage 32 (as viewed in FIGURE 1) for scanning, the limit switch 10LS, which is mounted on stop 151, is operated momentarily by contact with dog 153b which is mounted on shock absorber 153. The hard rubber pad 151a on stop 151, which absorbs much of the impact, yields sufficiently for momentary operation of limit switch 10LS before regaining its normal shape which is sufficiently thick to hold dog 153b from the plunger of the limit switch 10LS. When the carriage 34 reaches a patch position as determined by one of the stops 207, the rubber pad 164 (FIGURE 14) yields sufficiently so that bracket 255 operates limit switch 11LS. As the pad regains its normal thickness after absorbing the impact, the bracket will be spaced from the plunger of the limit switch.

At the beginning of a cycle of operation, the carriage 32 is forward and the carriage 34 is in the scan position on carriage 32 as shown in FIGURE 16A. All limit switches are unoperated.

The operator manually inserts an unprocessed sheet of plywood veneer 37 from stack 25 into clamp 36, as shown in FIGURE 16A, and closes pushbutton switch 440 momentarily. The actuation of switch 440 energizes solenoid 150a, through flip-flop circuit 443, to close the clamp and grip the leading edge of the sheet of plywood veneer. The operator also starts motor 44 by actuation of a switch 470 to connect the motor across a source of energy 471. Motor 44 runs continuously during operation of the automatic patching machine. Switch 490 is closed to connect the motors 89 and 98, which run continuously during operation of the machine, across energy source 471. Oscillator 335 is also started by closing switch 472 and runs continuously. The operator then momentarily closes pushbutton switch 351 (FIGURE 17B) to energize the forward clutch coil 92 (FIGURE 17A) through OR circuit 353, flip-flop circuit 342, and amplifier 350.

The energization of forward clutch coil 92 (see FIGURE 6) connects the forward motor 89 to the longitudinal carriage 32 and commences forward longitudinal movement of carriage 32. Carriage 32 carries with it carriage 34 and the plywood veneer sheet gripped thereby. As the sheet progresses longitudinally under the scanner, the three photomultiplier tubes, in conjunction with the rotating mirror holder and the six mirrors thereon, scan across the plywood sheet.

At the beginning of each pass, photomultiplier tube 52A responds to lamp 55 to send a negative reference signal to inverter 290 which inverts the signal and transmits it to set terminal 292 of flip-flop circuit 293. A positive voltage signal at set terminal 292 produces a zero voltage output at terminal 305 of circuit 293. The zero voltage output at terminal 305 opens NOR gate 308 to pass the pulsating signals from oscillator 335 into the binary counter 334. At the end of each pass, photomultiplier tube 52C responds to lamp 54 to send a negative reference signal to inverter 298 which inverts the signal and transmits it to reset terminal 300 of flip-flop circuit 293. A positive voltage at reset terminal 300 produces a positive voltage output at terminal 305. The positive voltage output at terminal 305 of flip-flop circuit 293 closes the NOR gate 308 to block the oscillator from the counter and stop the counting. At the same time, a zero voltage appears at terminal 301 of flip-flop circuit 293. If there is no defect detected (and consequently no signal in line 325) the NOR gate 304 will trigger monostable circuit 330 to produce a reset signal at the input to inverter 331. This signal is inverted and transmitted to reset terminal 333 of counter 334 to momentarily drop the voltage at terminal 333 for setting the counter. Thus, on each scanning pass, the counter 34 counts during the time a mirror 45 sweeps from one edge of the plywood sheet (indicated by reference lamp 55) to the opposite edge of the sheet (indicated by reference lamp 54) through the angle as shown in FIGURE 2, if no defect is detected.

When a defect is detected, as shown in FIGURE 16B, the photomultiplier tube 52B responds to the shadows or dark area caused by the defect 25a to produce a defect signal, indicated at 451, which is transmitted through inverter 294 and trigger circuit 295 to line 296. Since the defect signal in line 296, which comprises a drop in voltage, occurs within the scan area defined by boundary lines D and E, FIGURE 2 (so that there is no signal in line 306) and occurs while the forward motor is advancing the sheet (so that there is no signal in line 348), the NOR circuit 297 signals a defect at set terminal 312 of flip-flop 313 to produce a defect signal at the flip-flop output terminal 314. This defect signal is communicated from terminal 314 to NOR circuit 304, NOR circuit 308, the group of AND circuits 319, monostable circuit 316, OR circuit 361, and OR circuit 321. The signal sent to NOR circuit 304 prevents a reset of the counter; the signal sent to NOR gate 308 terminates the input to the counter to stop the count; the signal sent to the group of AND circuits 319 conditions these circuits for operation by the counter; the signal sent to the monostable circuit 316 produces a pulse of 150 milliseconds at the output terminal thereof; the signal sent to OR circuit 361 energizes brake coils 93 and 100; and the signal sent to OR circuit 321 produces a signal at reset terminal 341 of flip-flop circuit 342. It should be noted that the oscillator has an output of fixed frequency so that the numerical output of the counter (which counts pulses from the oscillator) corresponds to an interval of time. Accordingly, the oscillator and the counter may be considered a timer to measure the time between the reference signal triggered by lamp 55 and the defect signal triggered by a defect. Since motor 44 rotates the mirror holder at a fixed rate, this time interval also corresponds to a distance from the indicator lamp 55 to the defect. Since for each span of distance between the indicator lamp and the defect, the sheet must be laterally moved a given distance to the patcher, the count will also indicate this latter distance. And since for any given distance of lateral shift, there is a particular stop 207, and stop on stop mechanism 152, to stop the carriage 34 after a lateral shift of that particular span, it will be seen that each numerical output of the counter corresponds to a particular stop 207 and a particular stop (195, 176, 177, 178) on plate 173.

The binary counter 334, which is connected to the AND circuits of group 319 through amplifier circuits, indicated as a group as 448, will either energize, or deenergize, each of the solenoids 186, 192 (FIGURE 14) which control operation of stop mechanism 152, and each of the solenoids 216a, 216b, 216c, 216d, 216e and 216f (FIGURE 13) which control actuation of the selector bars depending on the count in the counter, to render effective the particular stops corresponding to the count in the counter. Thus each selector bar will either be shifted in one direction or the other, and the position of all the selector bars as determined by the binary counter will result in one, and only one, blade 207 dropping into the effective position. The signal at reset terminal 341 of flip-flop circuit 342 removes the voltage from line 344 to deenergize the forward clutch coil 92 and disengage the forward motor 89 (FIGURE 6) from the longitudinal carriage. Flip-flop circuit 374 responds to the trailing edge of the pulse produced by monostable circuit 316, so that 150 milliseconds after the defect is detected, solenoids 123 and 131 (FIGURE 5) are energized to begin rapid forward traverse of the carriage 34.

Thus, as soon as a defect is detected, the counting in the counter, which started at reference lamp 55 at the edge of the board stops to give a measure of the lateral position of the defect with respect to the reference lamp 55 (regardless of the position of the plywood sheet in the clamp). The selector bars are actuated to select one of the stops in stop member 152 and one of the stop blades 207 in the group of blades 199 of the lateral positioning mechanism in accordance with the count in the counter which corresponds to the lateral position of the defect with respect to reference lamp 55 (FIGURE 2). It should be noted that since the lateral positioning mechanism positions the traverse carriage 34 in a particular lateral position on carriage 32, which has no lateral movement, the traverse carriage 34 will be positioned in a particular lateral position with respect to reference lamp 55 (regardless of the position of the plywood sheet in the clamp). Since the plywood sheet is in the same position in the clamp when the carriage 34 is in the scan position (when the defect is detected) and when the carriage 34 is in the patch position (when the defect is patched), the defect will be properly positioned under the patcher even if the plywood sheet is not placed in the clamp in any particular precise position.

At the same time forward traverse solenoid 131 is energized, the drop stop solenoid 235b (FIGURE 10) is energized, to lower lift bar 230 and release the blades 207. When the blades 207 are released, one blade only can drop through the selector bars into the path of bumper 205 (FIGURES 7, 8 and 12). As the shoulders 205a on the shock absorber plunger bumper hit the blade 207, the shock absorber 154 is slowed and stopped, and the stop mechanism 152, with the appropriate block in impact position in axis I (FIGURE 14) strikes the shock absorber to stop the carriage 34 with the defect 25a under the patcher 29, as shown in FIGURE 16C. As the carriage stops, limit switch 11LS is operated.

When limit switch 11LS is operated, a signal is transmitted to reset terminal 383 to reset the flip-flop 374, thereby dropping solenoids 123, 131 and 235b. When this occurs, the valve member 129 of valve 124 (FIGURE 5) returns to center to hold the carriage 34 against the stop 207 in the patch position. At this time, a signal is transmitted to monostable circuit 385 to trigger a 0.1 second pulse to momentarily energize relay 4CR.

The energization of relay 4CR initiates an automatic patching cycle in the patching machine 29. When the patch cycle is completed, a relay (not shown) is momentarily energized to close contacts 2CR2 (FIGURE 17B) and send a signal to the set terminal 402 of flip-flop circuit 403. The flip-flop circuit produces a pulse in response to the signal at input terminal 402 which energizes return traverse valve solenoid 130 (FIGURE 5) and lift stop solenoid 235a (FIGURE 10). At the same time, a signal is sent to OR circuit 394 which triggers monostable circuit 395 for 0.1 second to momentarily energize solenoid 123 (FIGURE 5) and introduce high pressure to cylinder 111. Energization of solenoid 130 operates valve 124 to return carriage 34 to the scan position, as shown in FIGURE 16D. Energization of solenoid 235a raises lift bar 230 to raise all the stop blades 207. Return of carriage 34 from the patch to the scan position on longitudinal carriage 32 operates limit switch 10LS (FIGURE 7).

When the contacts 10LS1 (FIGURE 17B) of limit switch 10LS are closed, a signal is sent to OR circuit 353. This signal is transmitted to the set terminal 355 of flip-flop circuit 342 which again energizes forward clutch 92. The signal from flip-flop circuit 342 is also transmitted through line 346, inverter 347, and line 348 to NOR circuit 297 to again condition the scanner for detection of defects.

The plywood veneer sheet continues longitudinal movement until another defect is detected, as shown in FIGURE 16E. When this occurs, the plywood sheet is again stopped at the point of detection, and then shifted laterally until the defect is under the patcher, as shown in FIGURE 16F. It should be noted that each patch position is unique; randomly occurring on the plywood sheet and differing both longitudinally and laterally from other patch positions, as can be seen from a comparison of FIGURES 16C and 16F. After the defect is removed and replaced with a patch, the plywood sheet is again shifted back to the scan position under the scanner, as shown in FIGURE 16G, for resumption of longitudinal feed and scanning.

It is not desirable to patch a defect on the trailing edge of the board, since the patch would extend beyond the edge of the board, so limit switch 12LS (FIGURE 4) which terminates scanning and patching of a sheet, is positioned for operation before the trailing edge is directly under the scanner. Limit switch 12LS, which is connected to the rear of frame 30, is momentarily operated by dog 450 on the longitudinal carriage. When switch 12LS is operated, the contacts 12LS1 (FIGURE 17B) thereof close and a signal is sent both to OR circuit 425 and OR circuit 321 (FIGURE 17A). OR circuit 425 triggers monostable circuit 434 which produces a 0.1 second pulse at an input to OR circuit 361. Circuit 361, acting through amplifier 363, causes energization of brake coils 93 and 100 for 0.1 second to stop the longitudinal travel of carriage 32. OR circuit 321 produces a pulse at input reset terminal 341 of flip flop circuit 342 to drop the positive voltage in line 344 and release forward clutch 92. The closing of limit switch contacts 12LS1 also produces a pulse at input set terminal 427 of flip flop circuit 428 which produces a positive voltage at output terminal 436 of circuit 428. This voltage is transmitted by line 437 to energize, through amplifier 367, the reverse clutch coil 99 (FIGURE 6).

With the reverse clutch coil 99 energized, the reverse motor 98 is connected to carriage 32 through the clutch 97 to move the longitudinal carriage back to the initial starting position thereof shown in FIGURE 16A. When the carriage 32 reaches the starting position, switch 13LS is momentarily operated to close contacts 13LS1 (FIGURE 17B). Closing of contacts 13LS1 initiates a signal which acts through OR circuit 425, monostable circuit 434, OR circuit 361, and amplifier 363, to again energize, for 0.1 second, brake coils 93 and 100. At the same time solenoid 150b (FIGURE 9) is energized to open the clamp 36. This permits the operator to remove the patched sheet and place it on the stack 26. The operator then inserts an unprocessed sheet from stack 25 into the clamp and the operating cycle is repeated.

Although the best mode contemplated for carrying out the present invention has been herein shown and described, it will be apparent that modification and variation may be made without departing from what is regarded to be the subject matter of the invention as set forth in the appended claims.

Having completed a detailed description of the invention so that those skilled in the art could practice the same, I claim:

1. In a plywood patching machine having a scanner and having a patcher spaced laterally from the scanner, said machine having a carriage to effect relative lateral shifting between the plywood and the scanner and patcher, said machine having means for moving the plywood longitudinally with respect to the scanner, the combination comprising means associated with the scanner to produce an output indicating with respect to the carriage the lateral position of the defect in the plywood, a plurality of stops each operable when rendered effective to stop the carriage, and means operable in response to said output to render one of said stops effective.

2. The mechanism of claim 1 in which said stops are spaced apart in the lateral direction.

3. The mechanism of claim 2 in which said output produces a numerical output.

4. The mechanism of claim 3 including a plurality of selector bars to hold said stops in an inoperable position, and a plurality of actuators to shift said selector bars into positions in response to said numerical output to render one of said stops effective.

5. The mechanism of claim 4 in which said selector bars have a plurality of slots arranged according to a binary pattern and in which said actuators shift each selector bar into one of two positions in response to said numerical output to release a selected one of said stops.

6. The mechanism of claim 5 in combination with a shock absorber to engage said selected stop and cushion the impact of the carriage.

7. In a plywood patching machine having means to move veneer longitudinally past a scanner and having a patcher spaced laterally from the scanner, said machine having a first support member and having a second a second support member mounted on the first support member, said second support member movable laterally with respect to the first support member to carry the veneer from the scanner to the patcher when a defect is detected in the veneer by the scanner, the combination comprising a first group of stops mounted on the first support member, a second group of stops mounted on the second support member, means to render one stop from each group effective, and a shiftable impact member mounted on one of said support members between said groups of stops.

8. The mechanism of claim 7 in which said impact member is a shock absorber.

9. The mechanism of claim 7 in which the stops of one of said groups of stops are laterally spaced apart to provide coarse positioning.

10. The mechanism of claim 9 in which the stops of said other group of stops are of different length to provide fine positioning.

11. In a plywood patching machine having means to move veneer longitudinally and having a scanner to detect defects in the veneer and stop the longitudinal movement of the veneer when a defect is detected, means responsive to the scanner to produce a numerical output to indicate the lateral position of said defect, said machine having a patcher spaced laterally from the scanner, said machine having a first support member and having a second support member mounted on the first support member, said second support member movable laterally with respect to the first support member to carry the veneer from the scanner to the patcher when a defect is detected in the veneer by the scanner, the combination comprising a first group of stops mounted on the first support member, a second group of stops mounted on the second support member, means responsive to said numerical output to render one stop from each group effective, and a shiftable impact member mounted on one of said support members between said groups of stops to engage one of said effective stops at one end and to engage the other of said effective stops at the other end.

12. The mechanism of claim 11 in which said impact member is a shock absorber.

13. The mechanism of claim 11 in which the stops of one of said groups of stops are laterally spaced apart to provide coarse positioning and in which the stops of said other group of stops are of different length to provide fine positioning.

14. The mechanism of claim 13 in which the stops of said one group of stops are evenly spaced and in which the maximum difference in length between the stops of said other group of stops is less than the spacing between the stops of said one group of stops.

References Cited

UNITED STATES PATENTS

| | | | |
|---|---|---|---|
| 3,141,589 | 7/1964 | Jochim | 83—371 |
| 3,191,857 | 6/1965 | Galey et al. | 83—371 |

GERALD A. DOST, *Primary Examiner.*

U.S. Cl. X.R.

83—367; 144—3

Disclaimer 3,452,791.—*Thomas E. Roberts, Jr.*, Saratoga, Calif. POSITIONING MECHANISM. Patent dated July 1, 1969. Disclaimer filed Feb. 14, 1972, by the assignee, *FMC Corporation*.

Hereby disclaims the portion of the term of the patent subsequent to May 27, 1986.

[*Official Gazette August 1, 1972.*]